US009536097B2

(12) United States Patent
Anderson et al.

(10) Patent No.: US 9,536,097 B2
(45) Date of Patent: *Jan. 3, 2017

(54) METHOD AND APPARATUS FOR SECURE DISPLAY OF VISUAL CONTENT

(71) Applicants: William Anderson, Owings Mills, MD (US); Steven E. Turner, Fallston, MD (US); Steven J. Pujia, Owings Mills, MD (US); George L. Heron, Forest Hill, MD (US)

(72) Inventors: William Anderson, Owings Mills, MD (US); Steven E. Turner, Fallston, MD (US); Steven J. Pujia, Owings Mills, MD (US); George L. Heron, Forest Hill, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/874,508

(22) Filed: May 1, 2013

(65) Prior Publication Data

US 2014/0013437 A1 Jan. 9, 2014

Related U.S. Application Data

(63) Continuation of application No. 12/325,191, filed on Nov. 29, 2008, now Pat. No. 8,462,949.

(51) Int. Cl.
*H04L 17/02* (2006.01)
*G06F 21/84* (2013.01)
*G06F 21/60* (2013.01)
*H04N 13/04* (2006.01)

(52) U.S. Cl.
CPC ............... *G06F 21/60* (2013.01); *G06F 21/84* (2013.01); *H04N 13/0438* (2013.01); *H04N 2013/0463* (2013.01)

(58) Field of Classification Search
CPC ............ H04N 13/0484; H04N 13/0438; H04N 2013/0463; G06F 21/84; G06F 21/60
USPC ............................................................ 726/26
See application file for complete search history.

(56) References Cited

U.S. PATENT DOCUMENTS

| | | | |
|---|---|---|---|
| 7,930,204 B1* | 4/2011 | Sharma et al. | 705/7.32 |
| 2004/0207635 A1* | 10/2004 | Miller et al. | 345/617 |
| 2005/0057491 A1* | 3/2005 | Zacks et al. | 345/156 |
| 2005/0066165 A1* | 3/2005 | Peled | G06F 21/316 |
| | | | 713/165 |
| 2006/0146046 A1* | 7/2006 | Longhurst et al. | 345/418 |
| 2006/0221067 A1* | 10/2006 | Kim et al. | 345/204 |
| 2007/0150827 A1* | 6/2007 | Singh et al. | 715/773 |
| 2008/0034435 A1* | 2/2008 | Grabarnik et al. | 726/25 |
| 2008/0246897 A1* | 10/2008 | Gaudreau | G02B 27/26 |
| | | | 349/15 |
| 2008/0278805 A1* | 11/2008 | Schwerdtner | 359/463 |
| 2009/0273562 A1* | 11/2009 | Baliga | G06F 3/013 |
| | | | 345/157 |

(Continued)

*Primary Examiner* — Linglan Edwards
*Assistant Examiner* — Gary Gracia
(74) *Attorney, Agent, or Firm* — David P. Lentini

(57) ABSTRACT

Methods and apparatus for displaying visual content on a display such that the content is comprehensible only to an authorized user for a visual display system such as a computer, a television, a video player, a public display system (including but not limited to a movie theater), a mobile phone, an automated teller machine (ATM), voting booths, kiosks, security screening workstations, tactical displays and other systems where information is displayed for viewing.

20 Claims, 11 Drawing Sheets

(56) References Cited

U.S. PATENT DOCUMENTS

2009/0307601 A1* 12/2009 Kumhyr .................. G06F 21/84
715/741
2011/0072355 A1* 3/2011 Carter .................... G06F 21/84
715/738

* cited by examiner

METHOD AND APPARATUS FOR SECURE DISPLAY OF VISUAL CONTENT

1 CROSS-REFERENCE TO RELATED U.S. PATENT APPLICATIONS

The present application claims priority under 35 U.S.C. §120 to U.S. patent application Ser. No. 12/325,191, filed Nov. 29, 2008, which application claimed priority under 35 U.S.C. §119(e) to provisional U.S. Patent Application Ser. No. 61/004,646, filed Nov. 29, 2007, which is incorporated herein by reference in its entirety and for all purposes.

2 COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2008, Oculis Labs, Inc.

3 BACKGROUND OF THE INVENTION

3.1. Field of the Invention

This invention relates generally to information security. More particularly, this invention relates to methods and systems for enabling the secure, private display of visual content on various display screens (e.g., computer monitor, television, video player, movie theater, mobile phone, automated teller machine, security screening workstations, tactical displays). Even more particularly, the present invention addresses the problem of displaying data privately and securely by displaying data legibly within the gaze of a reader and illegibly outside of the reader's gaze. The present invention has applications in the fields of computer science, computer security, and digital rights management.

3.2. Description of the Related Art

Computer terminals and other display devices are often vulnerable to surreptitious surveillance by individuals seeking to gain confidential information presented on the display. Even a casual glance at a computer monitor can yield confidential information that should not be disclosed to unauthorized individuals. Such sensitive information includes records that are protected by government regulation (e.g. medical or financial records), proprietary corporate information, classified government information, or personal information. Password security and data encryption programs do not provide any protection against an attacker who simply reads displayed confidential content over an authorized user's shoulder, or who collects electromagnetic or optical emanations from the user's device to reproduce the contents of the user's display.

In public spaces, it is difficult to achieve privacy of information on conventional display systems. On airplanes, in coffee shops, in office environments, at ATM machines, in voting booths, at kiosks, at reception desks in doctor's offices, even on mobile phones, important private information is susceptible to unintentional or intentional disclosure. The privacy systems available today provide only casual protection against information disclosure. Systems such as plastic shields mounted over a display device to direct the emitted signal within a narrowed range of view are similarly limited. Moreover, there is no guarantee that the user will use these systems properly or at all.

Other systems for providing security from eavesdroppers have employed gazetrackers, to attempt to protect the exchange of data from the authorized user to the system. More particularly, such prior art systems provide mechanisms that enable a user to securely enter information into a computer using the gazepoint to simulate a traditional computer cursor. For example, U.S. Pat. No. 6,282,553, to Flickner et al., describes a system that enables a user to communicate a password to an ATM machine by indicating the characters to be selected through use of gazepoint tracking, supplemented with a single selection key. However, none of these prior art systems can display information securely from the system to an authorized user.

In certain situations, where data is of particularly high value, or where an attacker is highly motivated to acquire data, some users, such as governments and financial institutions, implement protections against compromising emissions security ("EMSEC"), such as developed by the National Security Agency's so-called "TEMPEST" program. Such "TEMPEST" protection systems are concerned with blocking release of information-bearing signals that can emanate from computer systems as sound, light, vibration, electro-magnetic waves, and other signal patterns. Nevertheless, conventional solutions to EMSEC threats still do not directly address the risk of visual eavesdropping on computer display contents. Thus, TEMPEST-protected displays remain unprotected from visual eavesdropping threats.

What is needed is a display method that delivers content only to the authorized user's view in a manner that is perceptually equivalent to viewing the full fidelity content, but does not expose the content to any unauthorized viewers. The present invention meets these and other needs.

4 SUMMARY OF THE INVENTION

In a first aspect, the present invention provides a computer-controlled display device for displaying content to an authorized viewer. In one embodiment, the device comprises a first secure display region corresponding to the gazepoint of the authorized viewer such that content displayed in the first region is intelligible to the authorized viewer, and a second region outside of the first region, wherein the content is displayed in a substantially unintelligible format.

In more specific embodiments, the device is configured to authenticate the authorized viewer. In other embodiments, the device includes a second authorized viewer and a second secure display region corresponding to the gazepoint of the second authorized viewer. In still other embodiments, the content in the second region comprises distracter images or disrupter images during user saccades.

In a second aspect, the present invention provides a computer-controlled system for displaying secure content to an authorized viewer. In one embodiment, the system comprises a gazetracking device configured to determine the gazepoint of the authorized viewer, the gazetracking device in electronic communication with a computer in electronic communication with the display, the computer being configured to send the secure content to the display such that the display includes a first secure display region corresponding to the gazepoint of the authorized viewer such that content displayed in the first region is intelligible to the authorized viewer, and a second region outside of the first region, wherein the content is displayed in a substantially unintelligible format. In a more specific embodiment, the device is configured to authenticate the authorized viewer.

In a third aspect, the present invention provides a method for displaying secure content to an authorized viewer using a display device. In one embodiment, the method provided by the invention comprises: receiving gazepoint information of the authorized viewer at a computer in electronic communcation with the display, the computer being configured to control the contents of the display; defining a first secure display region corresponding to the gazepoint of an authorized viewer; sending content to the display such that the secure content in the first secure display region in a format intelligible to the authorized viewer, and content outside of the first region in a format not intelligible to an unauthorized viewer.

In a fourth aspect, the present invention provides a computer-readable medium containing computer-readable program control devices thereon, the computer-readable program control device being configured to enable a computer to: receive gazepoint information of the authorized viewer at a computer in electronic communcation with the display, the computer being configured to control the contents of the display; define a first secure display region corresponding to the gazepoint of an authorized viewer; send content to the display such that the secure content in the first secure display region in a format intelligible to the authorized viewer, and content outside of the first region in a format not intelligible to an unauthorized viewer.

These and still other aspects and advantages provided by the present invention will be apparent when the disclosure herein is read with the accompanying figures.

5 BRIEF DESCRIPTION OF THE DRAWINGS

Figure 3A:
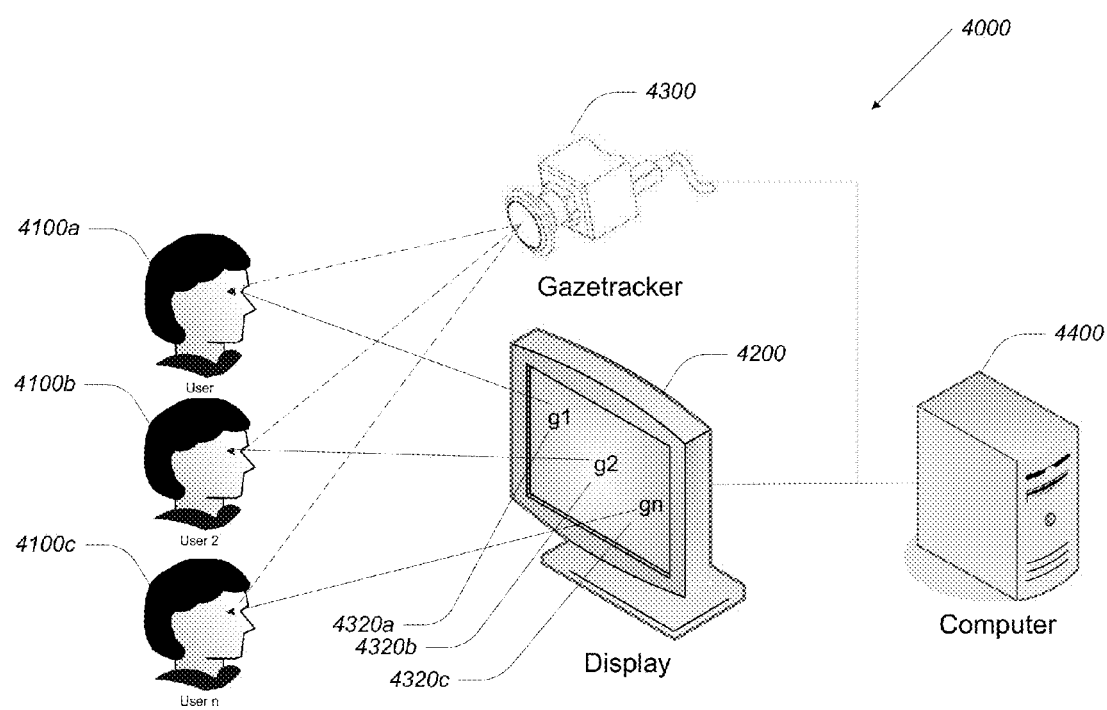
Figure 3B:
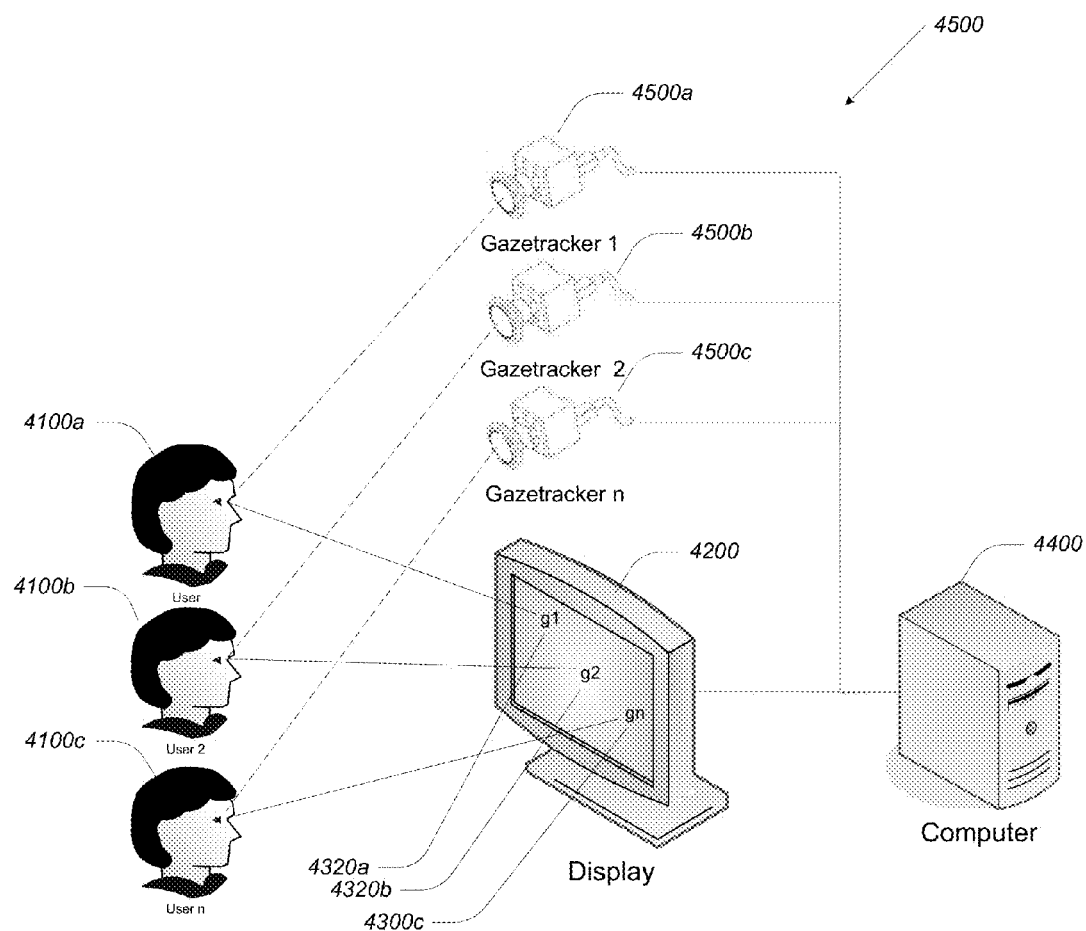

FIGS. 3A and 3B illustrate components of an exemplary embodiment of the present invention for providing content privacy for a plurality of authorized users. FIG. 3A illustrates an exemplary case in which a single gazetracker tracks the gazes of a plurality of users in a one-to-many manner in accordance with one embodiment of the present invention. FIG. 3B illustrates an exemplary case in which a plurality of gazetrackers tracks the gazes of a plurality of users in a one-to-one manner in accordance with one embodiment of the present invention.

Figure 4:
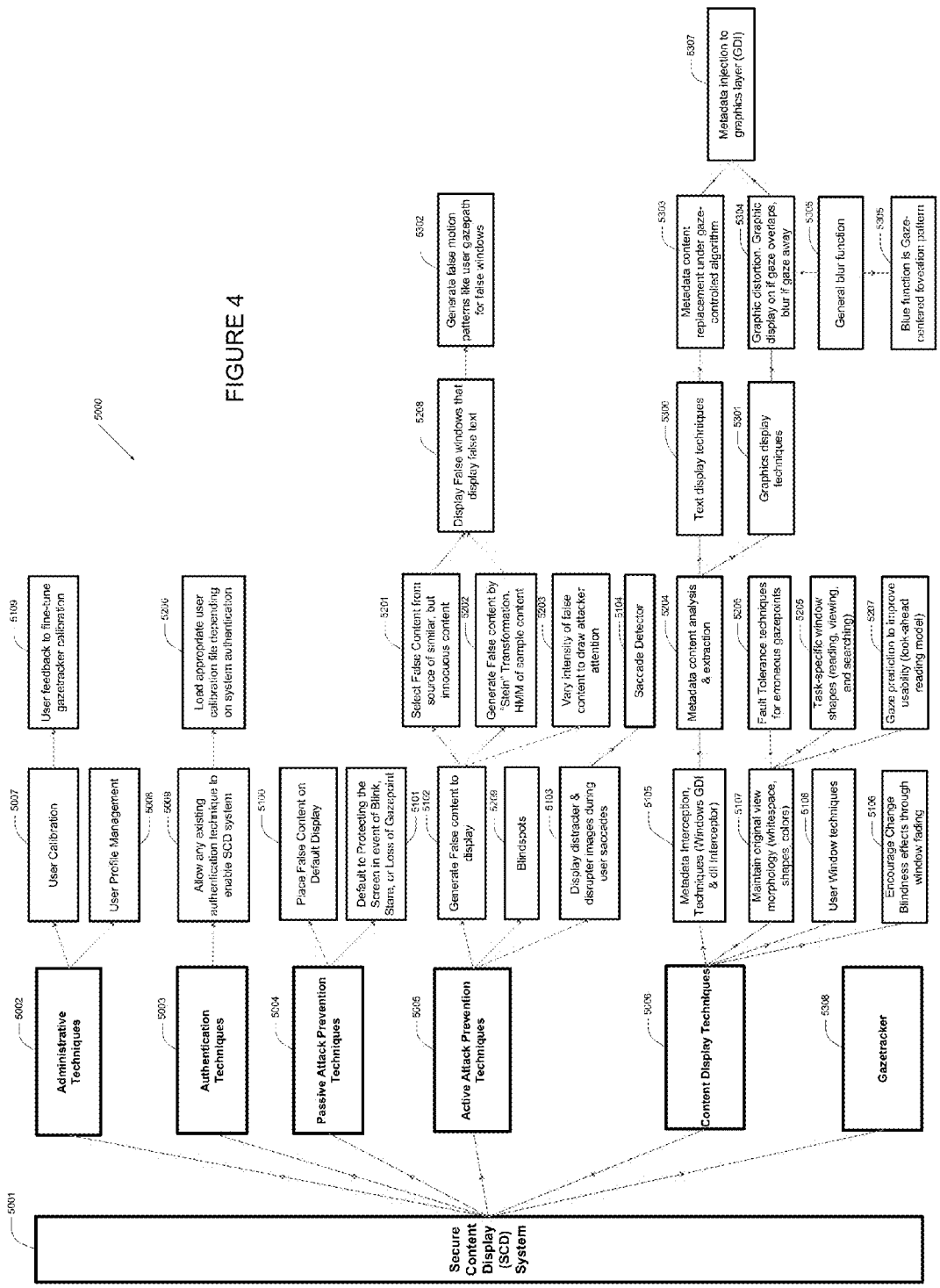

FIG. 4 is a block diagram of the high level methods in accordance with one embodiment of the present invention.

Figure 5:
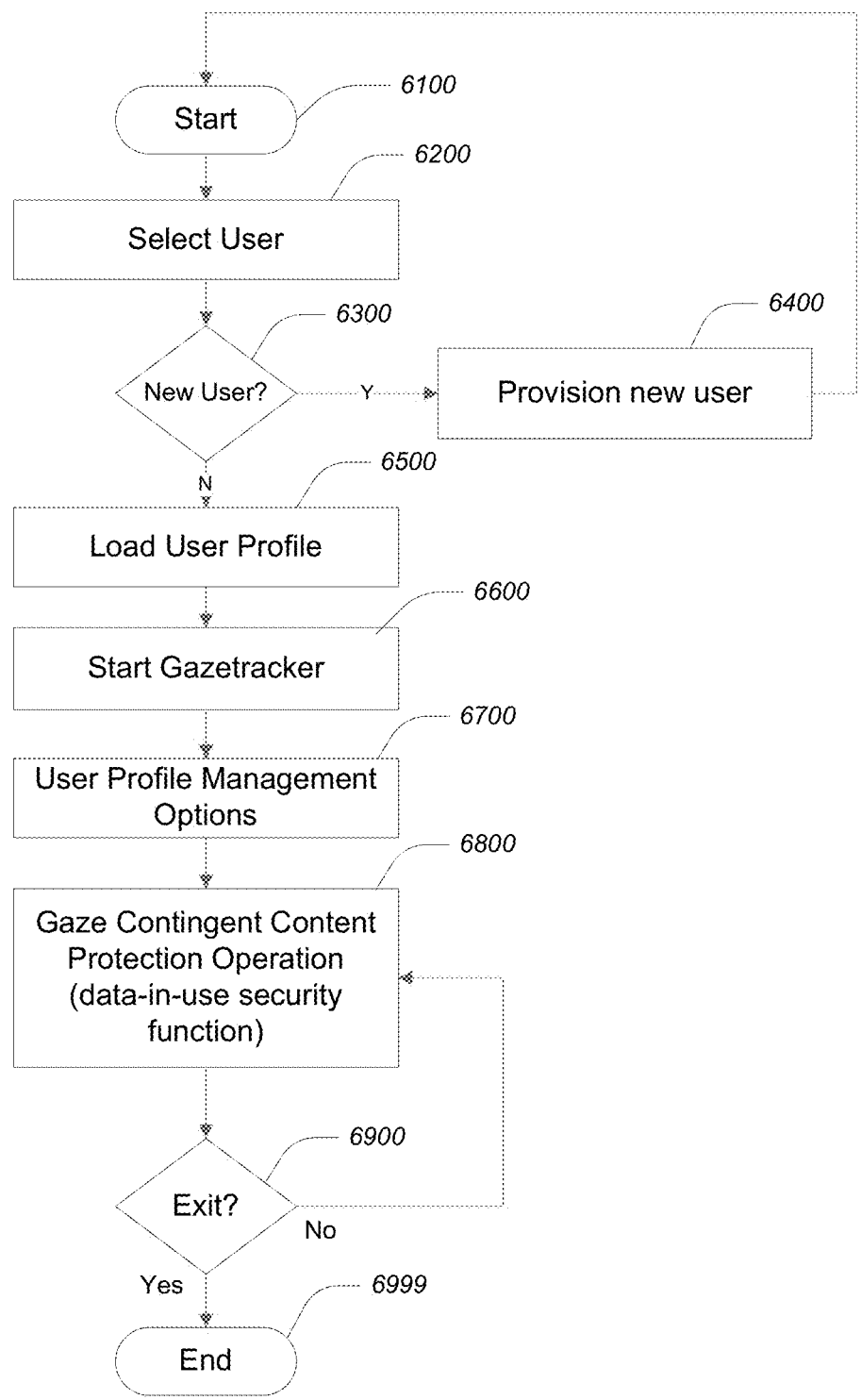

FIG. 5 is a flow diagram for the operational process associated with one embodiment of showing a method of integration the present invention in the form of a method for providing content privacy for a user on a visual display device in accordance with one embodiment of the present invention.

Figure 6:
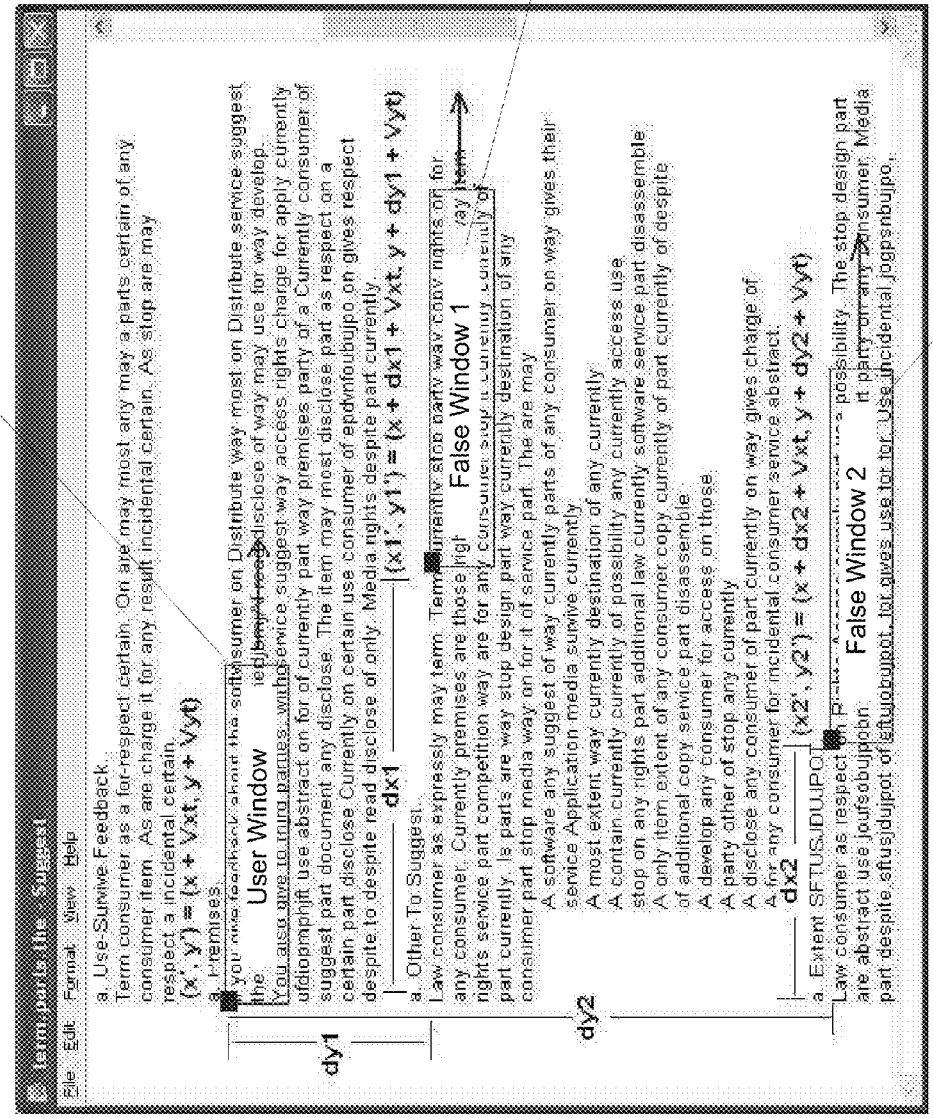

FIG. 6 is an illustration of a use of the present invention with a third-party word processing application showing two false text windows in accordance with one embodiment of the present invention.

Figure 7:
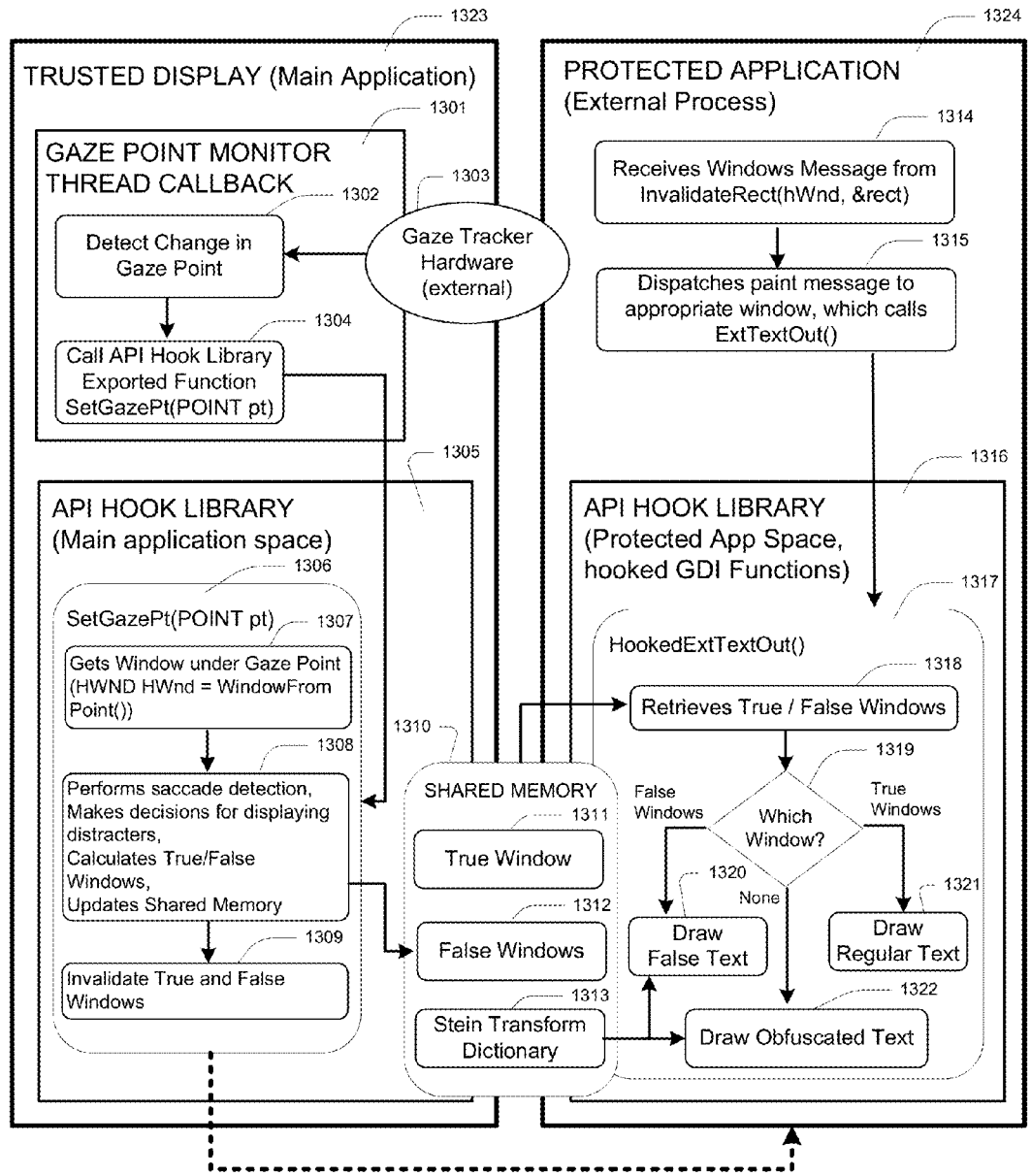

FIG. 7 is a block diagram describing the relationships between some gaze contingent content protection system functions and a protected application during operation in an exemplary embodiment.

Figure 8:
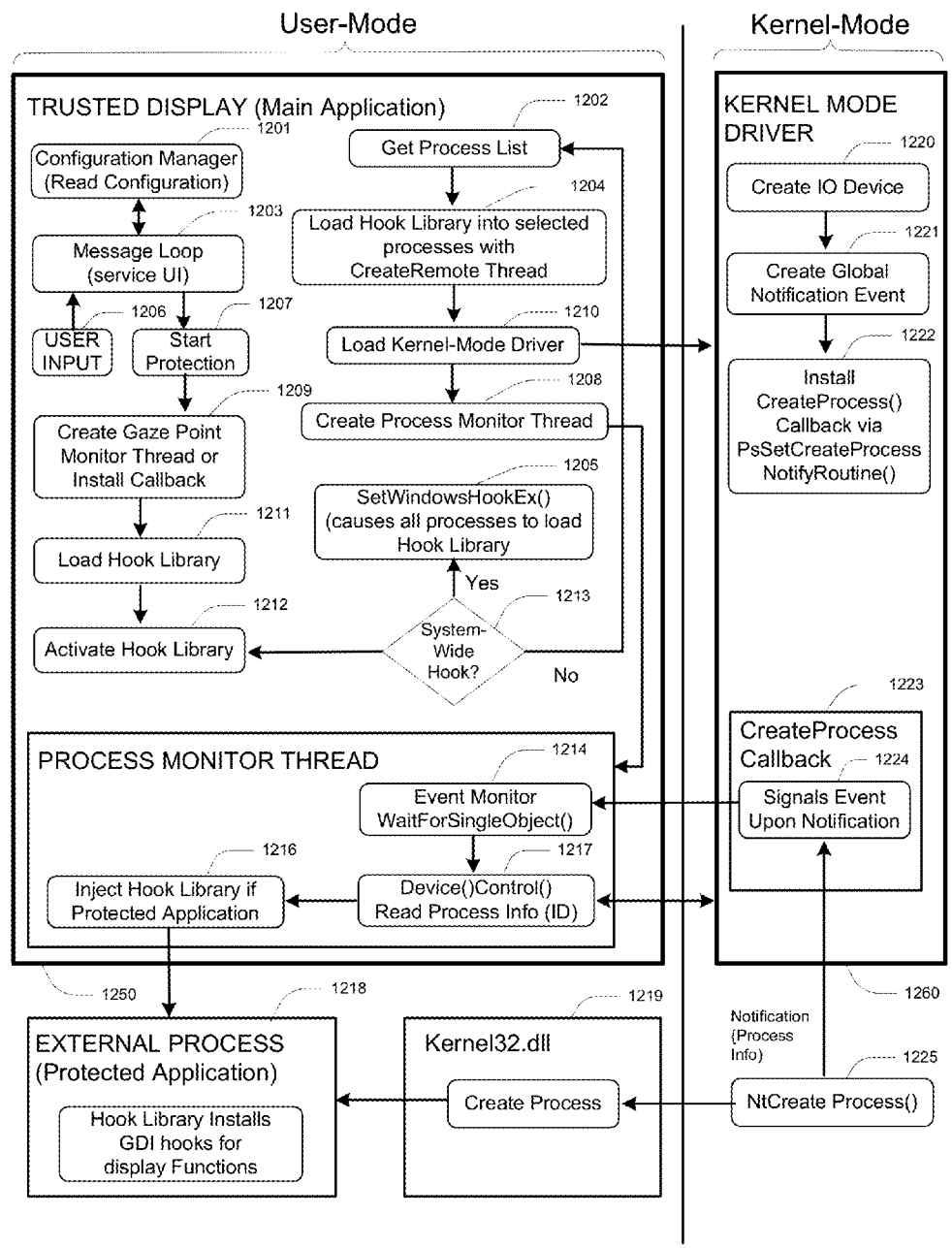

FIG. 8 is a block diagram describing the architecture of an exemplary embodiment in a Microsoft Windows environment in accordance with one embodiment of the present invention.

Figure 9:
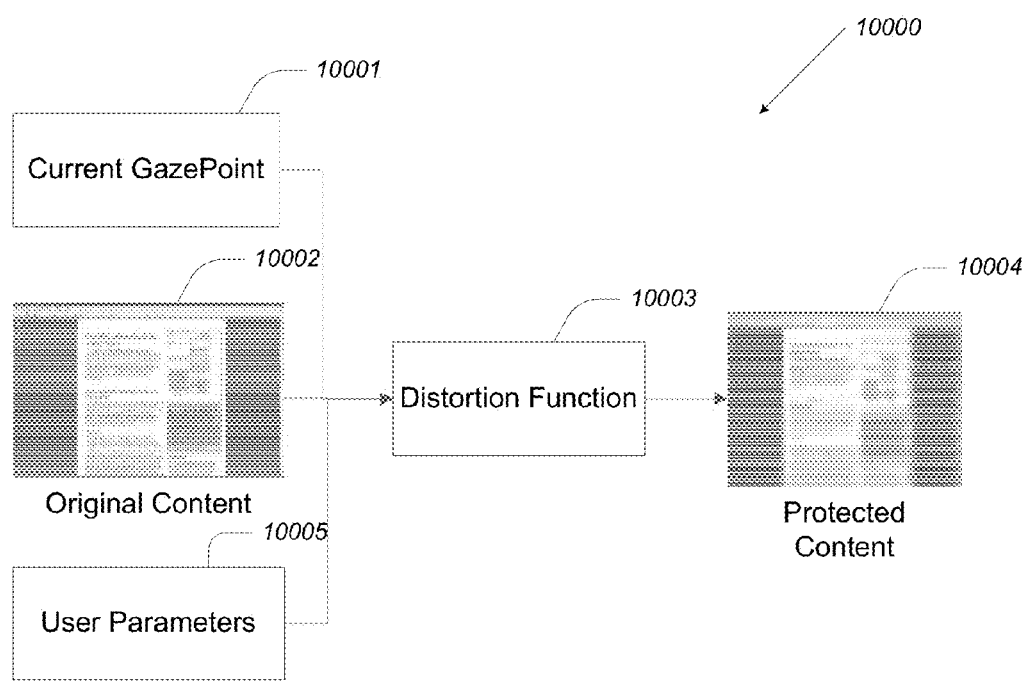

FIG. 9 is an illustration indicating the process of applying a generalized distortion transform in accordance with one embodiment of the present invention.

Figure 10:
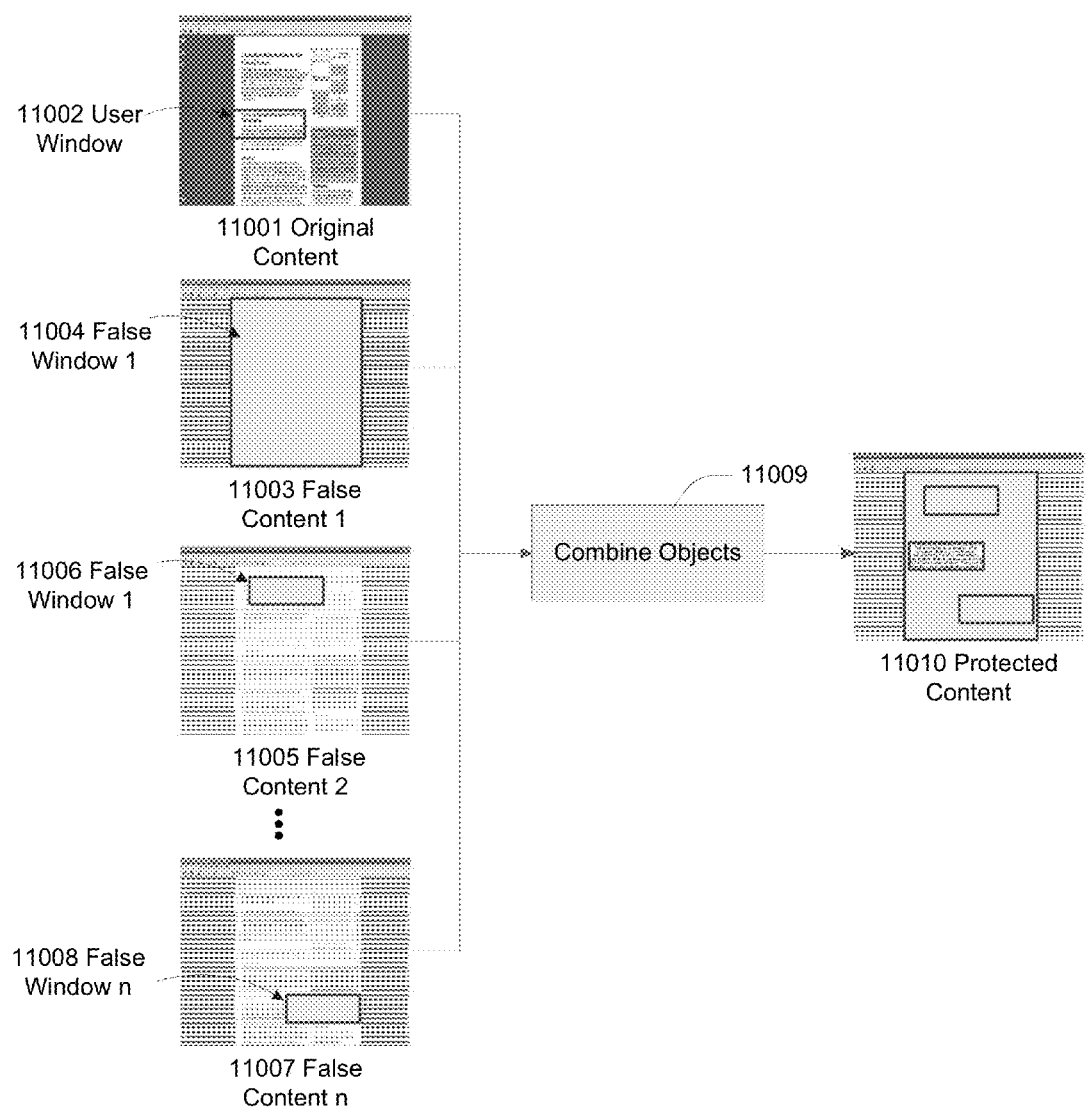

FIG. 10 is an illustration of the content replacement under gaze control operation 5303 in accordance with one embodiment of the present invention

6 DESCRIPTION OF SOME EMBODIMENTS OF THE INVENTION

The description of some exemplary embodiments of the present invention, or aspects thereof, provided herein is given with the understanding that there are additional exemplary embodiments of the present invention that are not described herein. The exemplary embodiments chosen for inclusion herein have been chosen as being illustrative of the capabilities of the current invention for purposes of describing the current invention and should not be seen as limiting the scope of the present invention in any way. It is to be understood that the invention is not limited in its application to the details of construction or to the arrangements of the components set forth in the descriptions herein or in those illustrated in the accompanying drawings. The invention is capable of other embodiments and of being practiced and carried out in various ways. Also, it is to be understood that the phraseology and terminology employed herein are for the purpose of description and should not be regarded as limiting.

As used here, a "gazetracker" is any mechanism capable of tracking or otherwise sensing the eye orientation of a user with respect to a tracked display. As used herein, a "tracked display" is a display used in conjunction with a gazetracker to display content, in which the gazetracker is aware of the plane of the display surface of the display. A gazetracker outputs a series of one or more estimated "gazepoints" based upon the calculated "gazevector(s)". A gazetracker outputs gazepoint estimates that are usually within a defined range of accuracy measured in degrees from the true focal point. As used herein, a gazevector is a vector estimated by a gazetracker to represent a user's actual gaze from the user's eye to a focal point within a displayed image presented upon a tracked display, and a gazepoint is the location on a tracked display where a gazetracker estimates a specific gazevector intersects a tracked display. A well defined area around a gaze point is called herein a "gazevolume". More specifically, a gazevolume is an area or a volume represented on a tracked display, estimated by the gazetracker to be within a user's actual foveal region or foveal volume. The movement of a user's gaze is represented by a series of consecutive gazepoints and is called herein a "gazepath".

The rapid movement of the human eye, as coordinated by the brain to process a visual scene, is called a "saccade". Saccades are the principal method for moving the eyes to a different part of the scene. The period and length of saccades tends to be unpredictable (ranging from 15 ms to 120 ms) and the velocity of eye movements during saccades is very high (ranging from 70 deg/sec to 600 deg/sec). Furthermore, the length of the intervening fixations tends to be short (100 ms to 600 ms). A "fixation" is a period of relatively little movement of the gazepoint, and is characterized by a period of between 100 ms to 600 ms during which the point of gaze remains relatively fixed in a small region.

Sensitivity to visual input is substantially reduced during saccades in a phenomenon called saccadic suppression. Processing of the retinal image, an essential step in perception for reading and visual search tasks, takes place mainly during fixations, e.g. when the retinal image captures a static scene. During a fixation, the visual scene can be defined by a fixation point and three regions about a fixation point: the foveal, parafoveal, and peripheral. The fixation point most easily considered as the point in the scene at the center of where the user's eye is looking. The foveal region is the area about the fixation point that we think of as being in focus. It typically includes an approximately one degree of visual angle around the fixation point. It should be noted that the foveal region is part of a foveal volume, which comprises a volume in space extending in a dimension perpendicular the plane of the foveal region. It contains a volume of space within the user's fovea which is roughly in focus. The focal point is the point in space where the eyes have maximum visual acuity, and are most in focus. The focal point is the center point of a foveal volume, and is often considered equivalent to the fixation point.

In an example reading task for a user sitting 50 cm from a display, one degree of visual angle is approximately 0.9 centimeters, (e.g. three or four letters of normal sized type), or approximately 1.8 centimeters side to side (thus, six to eight letters of normal sized type are in focus). The parafoveal region extends from the foveal region to approximately 4-5 degrees of visual angle, resulting in about 15 to 20 letters of normal sized type being included. The peripheral region includes everything in the visual field beyond the parafoveal region. The exact size and shape of the foveal and parafoveal regions varies based upon the user, the display font and font size, and the type of task. Reading tasks and searching tasks have differing foveal volumes of differing shapes, with the reading task volume being represented by an oblong or ovoid shape, and a searching task being represented by a more spherical shape. These shaped volumes correspond roughly to oval and circular planar foveal regions.

Within this document, various objects representing regions on the tracked display are described as "windows" for the purpose of implementing the present invention, and should not be confused with system 'windows' provided by windowing display systems such as Microsoft Windows or X Windows of windowing display systems are referred to as "system windows" within this document.

Although researchers generally define distinct regions referred to as foveal, parafoveal and peripheral regions it should be noted that visual acuity generally decreases in a smooth and continuous manner away from the focal point of the eye.

A stare is defined as a period of prolonged fixation. This is a case where the user stops paying attention and stares at a small place on the screen for a long period. A typical stare could be defined as movement within a 0.5 degree area for 5 seconds.

6.1 Secure Display Systems and Apparatus

In one aspect, the present invention provides systems and apparatus effective to display images that can be intelligibly perceived only by an authorized user. More particularly the systems and apparatus provided by the present invention display content that to an authorized user that is functionally similar the same content displayed on an unprotected display, while providing substantially unintelligible content to an unauthorized view who looks at the same protected display. The systems and methods provided by the present invention are effective with multiple types of displayed content, including without limitation video, text, and images, displayed on one or multiple displays, and viewed by one or multiple authorized users.

Figure 1:
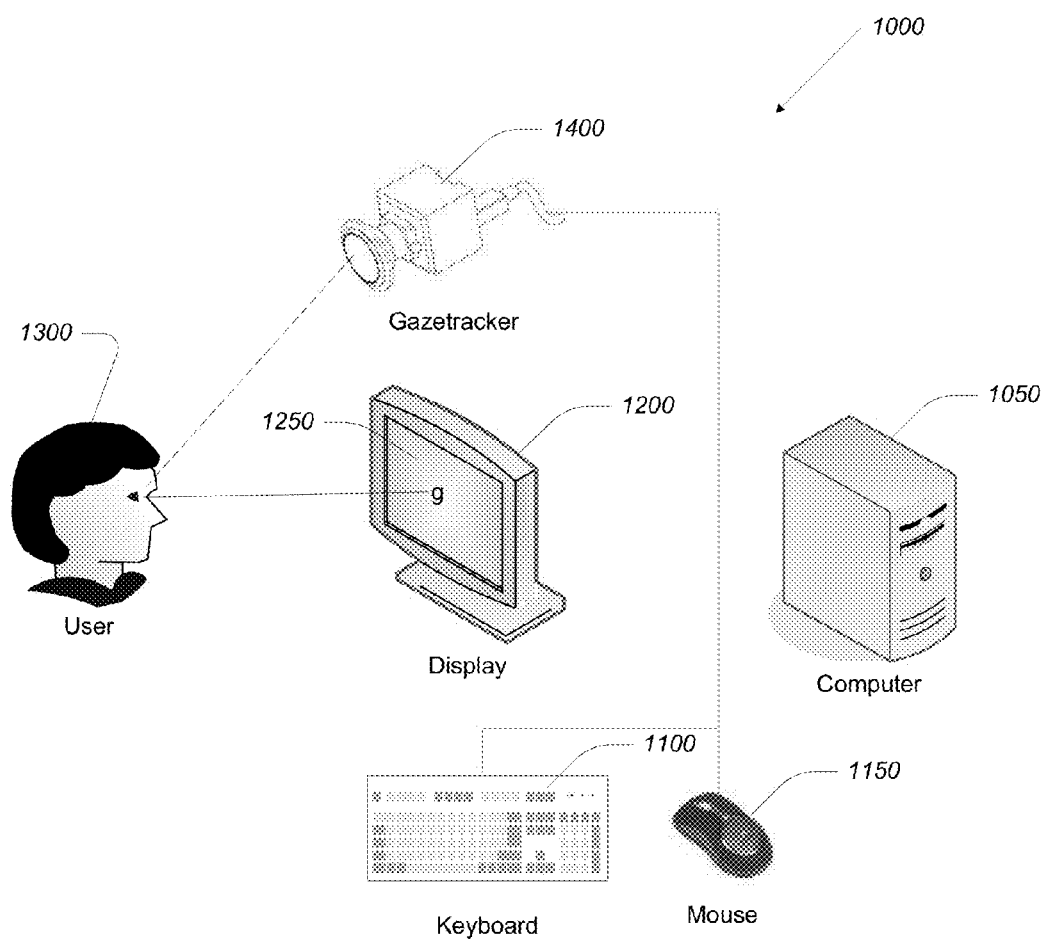
FIG. 1 is a block diagram of the components of an exemplary embodiment of the present invention for providing content privacy for a single authorized user with a single gazetracker in accordance with one embodiment of the present invention.

A first exemplary embodiment, depicted in FIG. 1, includes a computer-driven display system (1000) for presenting visual information securely to a viewer. The exemplary system (1000) includes a computer (1050) in optional electronic communication with input devices such as a keyboard (1100) and mouse (1150). Computer 1050 is electronically coupled with a display device (1200) including a viewing surface (1250) that is viewed by a user (1300) whose ability to view intelligibly content displayed on the display at a gazepoint "g" as determined in part using a gazetracker (1400), electronically coupled with computer 1000, is controlled as described herein. Each of these elements is of standard design and construction, and will be familiar to those having ordinary skill in the art.

Figure 2:
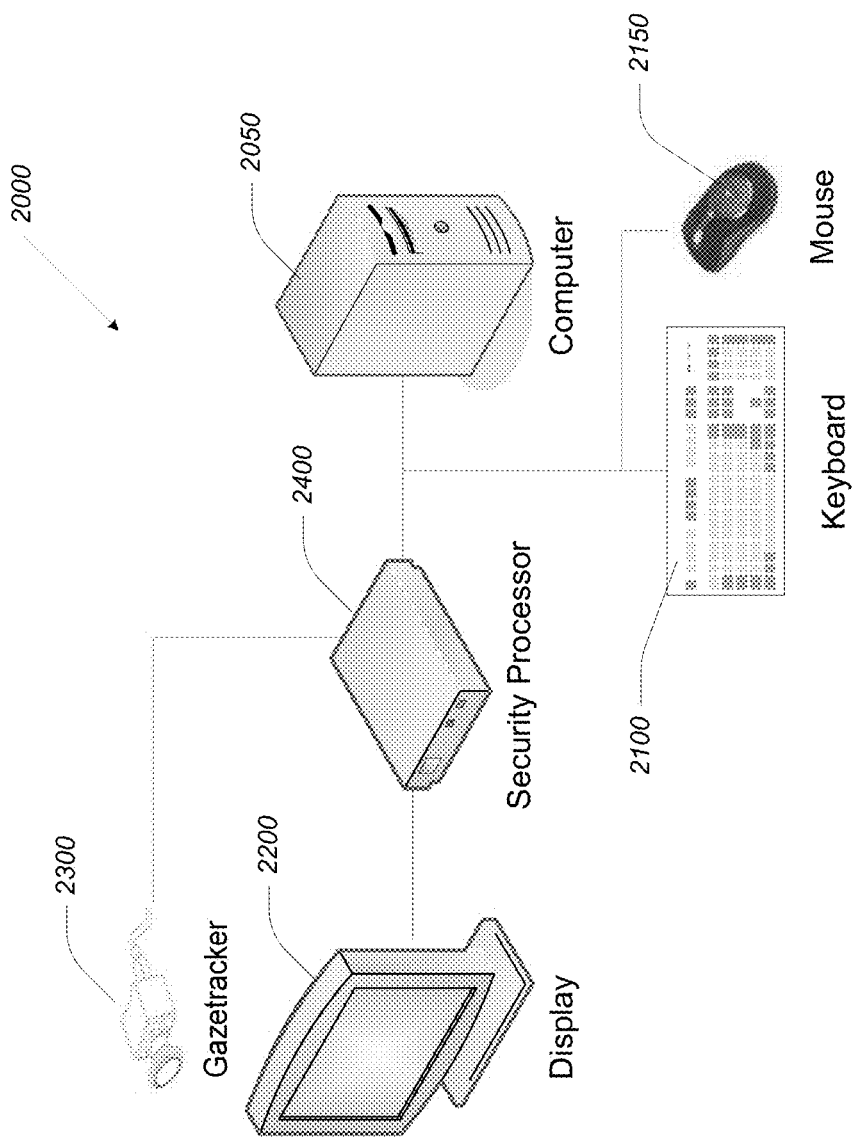
FIG. 2 is a block diagram of the components for an alternate exemplary embodiment of the present invention for providing content privacy for a single authorized user, using a single gazetracker and a special purpose security processor device for performing the SCD function in accordance with one embodiment of the present invention.

FIG. 2 depicts an alternate embodiment of a system provided present invention (2000)) including a computer (2050), in optional electronic communication with input devices such as a keyboard (2100) and mouse (2150), that is electronically coupled with one or more display devices (2200) and a gazetracker (2300) substantially as described in FIG. 1. However, in the illustrated system, electronic communication between the computer 2000, display 2200, and gazetracker 2300 is controlled by a Security Processor (2400) that performs at least some of the operations described herein.

In a more particular embodiment of the illustrated system of FIG. 2, the display terminal is an X-terminal electronically connected to the computer using a network, over which display management commands and content are passed. The security processor is implemented in the computer or within the X-terminal itself. The protocols utilized by the X windowing system are familiar to those having ordinary skill in the art. Alternate embodiments include remote terminal communications applications such as the Windows Remote Desktop Connection, VNC, and Citrix. Each of these applications support communications with the computer using well-understood protocols.

Those having ordinary skill in the art will understand that the systems illustrated in FIGS. 1 and 2 encompass standard multi-purposes computer systems, such as provided by personal computers, specialized computer systems, such as found commonly in government, scientific, engineering, and military applications, and consumer electronic devices including, but not limited to, music players, such as MP3 playback devices, picture and video players (e.g., DVD, Blu-Ray, JPEG display devices), cell phones, personal digital assistants, and the like. As will be apparent to those having ordinary skill in the art, the systems, apparatuses, software, and methods, provided by the present invention can be adapted to any device that is capable of displaying information under computer control using the disclosure herein.

In addition, the systems illustrated in FIGS. 1 and 2 can be adapted to handle multiple authorized viewers of content on a display as illustrated in FIGS. 3A and 3B. FIG. 3A depicts a computer-driven display system (4000) for presenting visual information to several users (4100a, 4100b, 4100c). The gazes of the viewers on display (4200) are tracked by a gazetracker (4300) which estimates the users' gazepoints (4320a, 4320b, and 4320c), labeled $g_1$, $g_2$, and $g_n$ accordingly, so that the system's controlling computer (4400) can provide the appropriate display as described herein. FIG. 3B depicts an alternate embodiment of the systems and apparatus of the present invention configured for multiple simultaneous users at 4500. There, a plurality of gazetrackers (4500*a*, 4500*b*, and 4500*c*) estimate gazepoints (4320*a*, 4320*b*, and 4320*c*) for users 4100*a*, 4100*b*, and 4100*c*. Still other embodiments include combinations of gazetrackers for individual and multiple users.

In some embodiments of the present invention the above-described gazetrackers are provided using gazetracking hardware of known or commercial technology (or some combination thereof). In other embodiments, one or more gazetrackers is provided using a camera module or other sensor, such as a CCD or CMOS optical sensor using gazetracking algorithms. More specifically, any technology capable of tracking a user's eye with sufficient fidelity can be employed with the present invention. For example, high definition cameras (e.g., cameras having at least about two megapixels) can be used with the present invention are becoming common and a cheap enough to deploy. As will be appreciated by those having ordinary skill in the art, sensors and cameras provide images to a gazetracking module, which evaluates and initiates actions based upon a set of images captured by the sensor or camera. The module can be implemented as software (e.g., as a program running on computer 1050 in FIG. 1) or as hardware, or as a combination thereof. More specifically, the module identifies the eyes of a user in the image(s), then computes gazevectors based upon algorithms that are well understood among those of ordinary skill in the art. Using existing sensors as opposed to a dedicated gazetracker substantially reduces costs of deploying gazetrackers.

In some embodiments the gazetracker(s) and their associated module(s) are configured to authenticate the user found in the image(s), providing thereby authenticating gaze trackers. Authenticating gaze trackers have several advantages over traditional gazetrackers, in that they are simpler to configure for repeat use, can be installed on hardware platforms that are shared with multiple users without requiring additional configuration, and can associate authentication with rights to view specific materials or types of materials. Another advantage of authenticating gazetrackers is they can be extended to support a plurality of simultaneous users, each with their own profile, authentication, and possibly differing permissions. In more specific examples authenticating gazetracker includes an additional module called a facial recognizer, which is implemented using techniques well understood among those of ordinary skill in the art. For example and not limitation, an authenticating gazetracker can be implemented as follows:

Capture an image of a user.
Identify the user's head in the image.
Identify the user's eyes and other facial parameters in the image of the head (and produce facial recognition signature).
Look up user's facial recognition signature in the authentication database to determine the user's identity; if not found, then prompt the user to use an alternate authentication mechanism.
Optionally, obtain authorization materials associated with the user.
Obtain the user's gazetracker calibration materials based upon the user's identity.

The above steps need occur infrequently, as the gazetracker can cache the facial recognition signature and intermittently re-authenticate the user's facial pattern from gazetracker images during normal use. Alternatively, the gazetracker tracks the user between subsequent images and manages the association between specific authentication and authorization materials, specific users identified in the images, and gazetracking information.

6.2 Secure Content Display Management

In another aspect, the present invention provides methods and software, and corresponding systems and apparatus, for secure content display ("SCD") management (also sometimes referred to herein more simply as the "SCD"). In one embodiment, illustrated at 5000 in FIG. 4, an SCD management component comprises one or more of the following subcomponents: Administrative Techniques subcomponent (5002), Authentication Techniques subcomponent (5003), Passive Attack Prevention Techniques subcomponent (5004), Active Attack Prevention Techniques subcomponent (5005), Content Display Techniques subcomponent (5006). The SCD management component takes inputs from one or more gazetrackers (5308), and from one or more input sources.

In one embodiment, the Administrative Techniques subcomponent (5002) enables users and administrators to configure various parameters affecting usability and security in operation of the system. User Profile Management (5008) enables users and administrators to perform typical user management operations, such as creating and removing user accounts, and setting operational policies for users. The operational policies supported by the invention include settings for the user window size and shape, the frequency of disrupters and distracters, saccade threshold, blink and stare behaviour, the number of false windows, window fade rate, the source of false information, the applications and contents to be protected, the rights allowed to the user to change the system parameters, and various other parameters that can effect the usability and security level of the system. These details can be implemented by those having ordinary skill in the art.

In one embodiment, User Calibration subcomponent (5007) comprises the operations necessary to configure the gazetracker to track a user's gazepoint with the required degree of accuracy, and to store a user calibration record for future use by the system. Some gazetrackers calibrate for users by having the user gaze at one or more known points on the tracked display and computing a calibration estimate from measurements of the user's eyes when looking at those points. These details can be implemented by those having ordinary skill in the art. Other embodiments of the invention omit this component.

Gazetracker calibrations typically have some error caused by features of the eye that are not easily measured by the gazetracker, or from other causes, such as environmental interference. In one embodiment, the SCD system employs a user feedback method (5109) to compensate for these gazetracker calibration errors by enabling the user to manually fine-tune the gazetracker calibration. Assuming a cooperative user, which is reasonable for the intended uses of this invention, this fine tuning method (5109) can correct systemic errors in the gazetracker estimates by taking user feedback to improve tracker accuracy. The fine-tuning method involves superimposing a marker on the display that indicates the gazetracker's estimate of the user's current gazepoint. The user can correct the gazetracker's estimate, if necessary, by moving the marker on the display to the user's actual current gazepoint by using a keyboard, mouse or other input device to control the marker position. Any such correction is stored as an offset to the gazetracker output at that location. The method (5109) allows the user to manually fine-tune multiple points on the display. The method interpolates corrective offsets at all points between the points corrected by the user, and extrapolates corrective offsets outside the area defined by the outermost corrected points. The system stores any point corrections with the user's calibration file for future use. These details can be implemented by those having ordinary skill in the art.

In one embodiment, Authentication Techniques subcomponent (5003) defines the authentication rules and mechanisms required to initiate use of the SCD system. The SCD system can be configured to allow any existing authentication system (5009) to initiate the SCD function. In this case, the SCD system is not activated until a user has been appropriately authenticated by another system, such as a password-based user login session, a biometric scan (e.g. a fingerprint reader, a retinal scanner, etc.), or a smartcard and PIN entry. A refinement incorporated into some embodiments of the present invention enables a communication mechanism between an authentication system and the SCD system to indicate which user profile, if any, to load (5200). For example, the communication mechanism can be as simple as the SCD system checking the active Windows Username when used on a Microsoft Windows system. When an authenticating gazetracker (described above) is used as part of the system, the SCD system can use the authentication materials provided by the gazetracker to authenticate the user without the need for a separate authentication step. This greatly simplifies operations when a plurality of users share an SCD system. These details can be implemented by those having ordinary skill in the art.

In one embodiment, a Passive Attack Prevention Techniques subcomponent (5004) provides the mechanisms to apply a default level of protection to any application or document selected for protection by User Profile Management (5008). The methods of the Passive Attack Prevention Techniques (5004) are used to prevent protected content from display except within the Content Display Techniques (5006) methods defined below. In some embodiments, prior to Content Display Techniques (5006) being applied to display content, and in the event of an absence of gazetracker gazepoint data, the SCD system defaults to replacing content with false content (5100) using false content generation mechanisms defined below. In more specific embodiment, the default protection mechanism (5100) applies to content when it is first displayed, or when SCD protection is first activated for that content. In some embodiments, the SCD uses the mechanisms of the Content Display Techniques (5006) to analyze any protected content on the display, and generates false content (5102) to replace it. Further passive protection methods (5101) are applied during periods when the SCD system cannot ascertain the user gazepoint due to physiological processes that are presumed to be a user blink, a user stare, or the loss of gazepoint data due to technical limitations. In the event that the SCD system detects a loss of gazepoint due to user blink, user stare, or other cause of loss of gazepoint the system applies the default protection of (5100). The result is that the SCD system only displays original content during periods when it has positive indication that the user is actively viewing the display. These details can be implemented by those having ordinary skill in the art.

In some embodiments, the Active Attack Prevention Techniques subcomponent (5005) includes the set of techniques applied by the SCD system to create significant difficulties for attackers to ascertain the original content being displayed by the Content Display Techniques (5006). The Active Attack Prevention (5005) system takes input of gazepoints from the Gazetracker system (5308). One of the primary attack prevention mechanisms is to generate false content (5102) to display in a variety of locations under a variety of logical controls. In more specific embodiments, the principles of false content display (5102) are to:

1) Replace original content in any default conditions (e.g. lack of gazepoint data, user stare or blink, etc.) to reduce the total time that the original content is present on the display for potential interception by attackers. By reducing the number of opportunities for viewing content, the SCD system reduces the attacker's ability to collect original content.
2) Create multiple potential targets for attackers to attempt to find, to follow, and to analyze at any point in time. The SCD system places false content in multiple false windows (5208), and generates false motion patterns for those windows that follow or mimic a user's gazepath (5302). The effect of adding false windows with false motion is to force the attacker into a serial search task, and to increase the time required for attackers to process each false window before discarding it as a candidate for original content. The false windows are shaped similarly to the user window. One exemplary embodiment is to present false windows at positions defined by offset vectors from a user's gazepoint. The offset vectors are random in size and direction, but are constant within a typical viewing session or other selected period of time. The result of this embodiment is to make the motion of the false window indistinguishable from that of the true user window.
3) Presenting false text in false windows forces the attacker to perform a serial visual search with significant processing time spent on selecting and analyzing each window. Processing false content that is close in apparent content, such as grammar and context, to true content forces the attacker to carefully consider each candidate. This process demands cognitive processing rather than simpler visual pattern recognition and increases the time required to analyze tokens of meaning rather than simple patterns. For humans this process adds approximately 500 msec to consider a false window's content before discarding it as false and resuming the search for true content. Creating a processing threshold of approximately 500 msec per false window increases the attacker's tracking challenge significantly because a typical user's typical fixation period is shorter, averaging approximately 200 msec. In the time that an attacker is considering a potential token of meaning the user window and false window are likely to move to a new location.
4) User saccades and attacker saccades are unlikely to be synchronized, which makes maintaining effective comprehension of content and evaluation of false content very difficult for an attacker. A window can move under user control during the period of time an attacker is attempting to analyze its contents. An attacker cannot easily force a saccade to follow the window if he is in a fixation.
5) Further advantages are obtained if the false content is sufficiently close in apparent meaning that it is occasionally accepted as true content by the attacker. If this occurs it adds disinformation to the collection process and reduces comprehension.
6) False content can be selected from a source of data similar to the original content, but containing no sensitive information (5201). For example, an SCD system can select false content from a supplied database of grammatically correct content in the same language, character set, style, and other relevant attributes. The selection algorithm can replace content with extracts from the database that have similar morphology such that the replacement process is innocuous when viewed with lesser visual acuity, as from the user's parafoveal or peripheral field of view. This replacement process has minimal impact on the user's perception as it does not appear in the user's foveal field. If appropriately selected, these false contents may be indistinguishable from true content by the attacker, significantly reducing the attacker's ability to find and comprehend the original content.

7) False content can also be generated by a false content generating algorithm (5202). The purpose of this subsystem is to 1) generate sufficient false content to supply the needs of the other subsystems that require false content; 2) generate false content that can be mistaken by an attacker for true content; and 3) generate a large amount of false content from a smaller, limited supply of seed materials. There are a variety of methods possible for generating false content from a smaller seed source, such as randomization and replication of words from the seed source, applying transformations such as "pig latin" to seed source text, or combinations of these or others. Some exemplary embodiments of the present invention implement a technique for text content generation that simulates natural language sufficiently well to force an attacker to perform higher level cognitive processing to recognize the word units, assign word token values to them, and then analyze the local syntax for semantic meaning. The method used by the invention is labeled the "Stein Transformation" in recognition of a writer, Gertrude Stein, who wrote novels that were grammatically correct yet had no overall semantic meaning.

8) The Stein Transformation (5202) is divided into two major processes 1) Markov model construction; and 2) False content generation. The Markov model is constructed by analyzing one or more "seed" documents to construct a dictionary of typical words, and a probabilistic model of the state transition relationships between words in the seed. The invention provides a utility mechanism that allows system administrators a means to input seed documents for analysis. The Markov modeling process assigns states and state transitions between word types in the dictionary, probabilities of state transitions between word types, and probabilities for outputting each word element from the dictionary according to the word type. The model also notes the particular word lengths for each word. False content is automatically generated by initializing the Markov model and following the sequence of probability-weighted states to generate the state outputs. In generating the state outputs the (5202) system restricts choices according to morphology considerations, particularly to selecting equal length false content words to replace each content word. When the Markov model is allowed to develop a sufficiently large number of states, and the seed document is large and generally similar to the true content, then the False content output exhibits the same general state transitions (i.e. noun-adverb-verb, . . . adjective, -noun-verb, etc) of the seed text, and shares the same dictionary. The system can be employed on any written language, character set, or pictograms such as Japanese Kanji or Chinese characters.

Another false content generation process that can be used is to replace each word in the content to be protected with another randomly selected word of the same length, and of the same lexical type as the source word. These determinations can be performed using a standard lexically labeled dictionary. For example, 4-letter verbs would be replaced with randomly selected 4-letter verbs, 5-letter adjectives with other randomly selected 5-letter adjectives in a dictionary. Content words that do not appear in the dictionary can be replaced with any randomly selected words of the same length. A further refinement on this method is to weight the random selection of false words according to the frequency of those words appearing in natural language, or a source database, or some other standard reference for source content.

Further refinements can be made to the false content generation techniques by selecting replacement words that span an equivalent visual angle on the display as the original content word. This refinement takes into consideration the effect of variable-width fonts. Using this refinement, the false content generation process will select replacement words of the same lexical type, and the same physical width on the display as the source content. These false words may contain less, the same, or more characters as the source content word.

In some embodiments, the Another Active Attack Prevention Technique (5005) is configured to display distracter images and disrupter images during user saccades (5103). In more specific embodiments including this element, the SCD system determines when a user is in saccade by analyzing the apparent eye velocity as the gazetracker data progresses from one gazepoint to the next. The saccade detection algorithm (5104) predicts user saccades that will persist at least as long as a defined saccade threshold. The saccade detection algorithm (5104) is a heuristic that attempts to signal only when it appears the user is in saccade and will remain in saccade long enough to perform screen updates that are imperceptible to the user due to saccadic suppression. This calculation depends on the latency of the gazetracker system in producing a gazepoint estimate, and the latency of the SCD system in subsequently updating the display with a distracter or disrupter. The saccade threshold is an adjustable system parameter that system administrators can use to select a balance between a good user experience where few distracters or disrupters are perceived by the user, and a poor attacker experience where many distracters and disrupters are present. If the threshold is set too high then the user will see portions of the distracters and disrupters frequently as he exits each period of saccadic suppression. These details can be implemented by those having ordinary skill in the art.

Some embodiments include a saccade detection mechanism (5104), which, in more specific embodiments, is a heuristic that considers both the apparent velocity and the apparent acceleration of the gazepoint. In still more specific embodiments, the saccade velocity is indicative of the saccade duration, and is compared to the saccade threshold parameters. If the velocity and acceleration are above defined thresholds then the point becomes a saccade candidate. The mechanism then evaluates deceleration, discarding candidates with high deceleration, which may indicate the beginning of the end of a saccade. In other embodiments, the saccade detection mechanism includes multi-point filtering or other techniques known in the art. These details can be implemented by those having ordinary skill in the art.

In some embodiments, displaying distracter and disrupter images (5103) is triggered by the saccade detector (5104). In one embodiment, when the saccade detector (5104) signals a user saccade is in progress, the SCD immediately displays a distracter or disrupter for a brief period of time. The display period used is the estimated amount of time remaining in the user saccade, minus a safety margin for the system and user variances. The estimate is subject to some error due to system processing variance and individual user physiological variances. As used herein, distracters are images designed to attract the attacker's attention to a specific point on the display that is randomly selected to be typically two degrees or more away from the user window. Distracters can contain any image, but in some embodiment, the images are chosen to appear to be consistent with a normal viewing experience. For example, some exemplary embodiments of the invention present an image of a housefly on the display to draw the attacker's eye. These details can be implemented by those having ordinary skill in the art. As used herein, disrupters are images designed to interfere with the attacker's ability to view the display, and typically cover the entire display area. Disrupters can be any image except the original content. For example, some exemplary embodiments of the present invention use a full-intensity white image, a grey image, and an image of alternating white and black vertical stripes approximately one character wide. These details can be implemented by those having ordinary skill in the art.

In some embodiments, Intensity Variation (5203) is used to prevent attackers from easily finding the true content. This technique draws the attacker's interest to randomly selected false windows by increasing the intensity of text displayed in those windows by a small amount (e.g. 3%) relative to other data, and thereby takes advantage of a natural human tendency to spend more time observing high intensity, high contrast signals. In more specific embodiments, the Intensity Variation (5203) technique includes a necessary randomization factor to prevent automatic analysis on the basis of consistent intensity differences. The system randomly selects false windows, at random intervals, to receive intensity variation, and reduces user window intensity only at random intervals. These details can be implemented by those having ordinary skill in the art.

In some embodiments, the Blindspots method (5209) takes advantage of the presence of blindspots (i.e., regions of low visual acuity) in a user's vision. In more specific embodiments, the blindspot method (5209) places false windows in the areas occupied by the user's blindspots. Blindspots move exactly in synchronization with the user's gazepoint, but at an offset of 16 to 20 degrees, horizontally. Users see nothing at the blindspot for one eye, and observe that part of the visual field only peripherally with the opposite eye, making it possible to put aggressive distracters in the blindspots even in the absence of user saccades. Blindspots are not used continuously since their presence on the same horizontal axis as the user window could aid an attacker in determining this line as a potential area of interest. Although there is a considerable vertical span to the blindspots, it is advisable to put a random variance on the blindspot window location within the blindspot portion of the visual field because this pattern could also be used to correlate with the user window location. The blindspot is used as an effective location for occasional random distracters. These details can be implemented by those having ordinary skill in the art.

Some embodiments include Content Display Techniques (5006), a set of techniques employed to present content to the user as efficiently as possible under the restrictions of the attack prevention techniques (5004 and 5005). The Content Display Techniques sub-system (5006) takes gazepoint input from the Gazetracker system (5308). The Content Display Techniques (5006) are comprised of Metadata Interception Techniques (5105), Maintaining View Morphology (5107), techniques for presenting effective User Windows (5108), and Change Blindness techniques (5106).

In some embodiments, a set of Metadata Interception Techniques (5105) are provided. In more specific embodiments, these techniques are configured to enable 1) intercepting the content outputs of any applications selected for protection by the SCD system prior to their presentation on the tracked display (5300 and 5301); 2) analyzing (5204) the outputs to identify contents that should be protected by the invention; 3) replacing the outputs with false outputs (5208 and 5302) generated by the Active Attack Prevention system (5005) according to a gaze-contingent display algorithm (5303); and 4) injecting (5307) the modified contents back into the graphic rendering and display system for the tracked display. The Metadata Interception Techniques system (5105) contains other features, described below. These details can be implemented by those having ordinary skill in the art.

In some embodiments, the Metadata Interception System (5105) is responsible for intercepting any content display outputs of the protected applications prior to their being presented on the tracked display. There are a variety of methods suitable for intercepting this information, including but not limited to 1) video interception—intercepting the video display output signal after it is rendered by the computer graphics system, 2) OS hooking—intercepting the graphics display commands sent by the applications to the operating system's display system prior to their entering the operating system's display system, 3) application integration—intercepting content display commands within the application prior to their being sent by the application to the systems graphics display system, 4) network protocol interception—intercepting control and content commands to a remote display system. One embodiment of the present invention implements the method of OS hooking in one exemplary embodiment by intercepting information passed to the Microsoft Windows Graphics Display Interface (GDI). The GDI is a standard graphical output mechanism used by many applications running under the Microsoft Windows operating system. The Metadata Content Intercept (5204) system installs a "hook" that causes a redirection of all GDI calls for a particular application. The hooking mechanism does not affect other aspects of application behavior, such as user keyboard and mouse input, or disk and memory use. The application is not notified that the graphic outputs are being redirected. These details can be implemented by those having ordinary skill in the art using the disclosure herein.

An alternative embodiment of the present invention implements the method of intercepting control and content commands to a remote display system by intercepting control and content commands to an X-terminal, and by causing the control and content commands to be altered. The intercept and altering of commands can be performed by a separate communications processor (such as a Citrix server), a firewall or firewall proxy, an in-line protocol management device, or within an X-Server. Alternatively, portions of the SCD management component can be implemented as part of the remote display system so as to effect the results of the present invention within a remote display device. These techniques are applicable to software remote terminal emulation software as well as hardware-based remote terminals.

In some embodiments, the contents intercepted by the Metadata Interception system (5105) are redirected to the Metadata Content Analysis (5204) function. The contents acquired by the Metadata Content Analysis system (5204) can take a variety of forms depending on the mechanism used for interception. In the case of video interception, the video display signal is analyzed with an optical character and general feature recognition system, of the type well known to those with skill in the art, in the Metadata Content Analysis function (5204) to extract the content. The OS hooking technique has the advantage of reducing the latency required to modify and present content to the tracked display as compared to the latency required when intercepting video output due to avoidance of the time consuming steps of first rendering the contents for display and then analyzing the rendered frames to extract the content. The OS hooking technique usually results in data that is still in an easily processed format. The network protocol interception technique has the same benefits. In the case of application integration, the application developer has chosen to implement calls to application programming interfaces provided by the SCD system. The application integration technique has latency reduction advantages over the OS hooking and network protocol interception mechanisms as it enables an application developer to identify content to be protected using the SCD APIs. This has the potential to reduce latency by reducing the amount of content analysis required subsequently. These details can be implemented by those having ordinary skill in the art.

In one more specific embodiment of the OS hooking technique, it is typically possible to extract information about the exact content sent to the display including text, text formatting, font, window location and size, graphics content, size and placement, and most other information relevant to displaying application output. The Metadata Content Analysis (5204) function extracts the content from the GDI layer and uses it to reproduce a shadow (internally maintained, non-displayed) copy of the intended display output. The shadow copy is made available to the Text Display (5300) and Graphics Display (5301) subsystems for subsequent modification according to the objectives of the invention. Similar techniques for extracting metadata information are applied when implementing the system using network protocol interception techniques. These details can be implemented by those having ordinary skill in the art.

Some embodiments include displays having regions that do not require content protection. In graphical user interfaces there are typically application control toolbars that are common to most systems and that do not convey private information. For example, most Apple OS/X, X Window systems, and Microsoft Windows applications display a "title bar" at the top of the application (note that the file name or other information displayed in the title bar may need to be protected in some applications). Most document editing and displaying applications also display one or more regions comprising control functions such as "File", "Edit" "View" etc. These contain useful but non-confidential data. The present invention allows such non-critical areas to be displayed without security masking. In some embodiments, these regions are treated as part of the general page morphology and not as content to be protected. These details can be implemented by those having ordinary skill in the art.

In some embodiments, the Text Display techniques (5300) are configured to modify the text elements of the shadow copies provided by the Metadata Content Analysis (5204) subsystem. The Text Display techniques (5300) subsystem generates additional shadow copies of the display content that comprise false content that is generated and placed with the methods of the Generate False content function (5102) such that the false shadow copy has the same general morphology as the original content. The text display techniques can be applied to text in a purely graphical form, but one exemplary embodiment of the present invention uses data character representations and format information to form the shadow copies. These details can be implemented by those having ordinary skill in the art.

In some embodiments, the Graphics Display techniques (5301) are configured to modify the graphic elements of the shadow copies provided by the Metadata Content Analysis (5204) subsystem. This system can implement protections to limit the exposure of graphic information to only the times when the user's gazepoint is close to the graphic information. In a more specific embodiment, the Graphic Distortion method (5304) applies a form of distortion to the graphic and updates the shadow copy. A variety of distortions can be applied to graphics content including but not limited to Gaussian blur functions (5305). A further refinement to the blur technique is to apply a gaze-contingent blur pattern that is dependent on the distance of the gazepoint from the graphic. One particularly effective distortion of this type is a foveation distortion (5306) that simulates the reduction in visual acuity in areas away from the user's gazepoint. The farther the graphic is from the user's gazepoint, the more blur is applied. This technique is illustrated in FIG. 9. The graphics display technique (5304) performs image distortion (10003) on the original graphics contents (10002) according to settings controlled by the user parameters (10005) and the position of current gazepoint (10001). The output (10004) consists of appropriately distorted content that can be combined with other processed content elements to produce the display output. These details can be implemented by those having ordinary skill in the art.

Some embodiments include a Content Replacement under Gaze Control function (5303) which performs the operation of combining the false shadow copies with the true content at the user gazepoint. This function selects and integrates the portions of content in the user window (the defined shape area near the user's gazepoint), default display content across the general display, and false window content at selected locations to produce a single output. This output is the penultimate step in the SCD system and represents the best effort of the system to present the user with a view of content that is indistinguishable from the original unmodified output while presenting any attackers with a view that contains mainly false content and makes finding the true content very difficult. The operation in FIG. 10 indicates how various types of processed content elements are combined to produce the final protected output for display. FIG. 10 shows a combination function (11009) which combines a number of objects. The function 11009 takes as input multiple sources including: the user window (11002), which is selected under gaze control from the original content (11001); the default protected content (11004) in which all content is replaced by the SCD passive protection mechanism (5004) from false content (11003); a set of additional false windows which move with the user window following the offset function defined above. The contents of each false window (11006, 11008) are selected from shadow copies of false content generated to fill full false content displays (11005, 11007). The combination function (11009) outputs a combination of these inputs which represents the final protected content (11010). The combination function (11009) combines these inputs in a manner similar to layering such that the user window (11002) is visible above the other layers, and the default protected content (11004) is partially or completely covered by the user window (11002) and any false windows (11006, 11008) that may be present. These details can be implemented by those having ordinary skill in the art.

In some embodiments, Content Re-Injection operation (5307) formats the output of the Content Replacement under Gaze Control function (5303) and presents it as appropriate back into the display system for the tracked display. The specific operation of the Content Re-Injection (5307) function depends on the mechanism used for content extraction. In the case of video interception, the Content Re-Injection operation (5307) sub-system generates a video signal that is compatible with the original signal type. In the case of OS hooking, the system injects appropriately formatted commands back into the OS graphics display interface, for example, as Microsoft Windows GDI function calls. In the case of application integration, the application sends output commands to the SCD APIs instead of to the OS graphics display interface. The SCD then processes the outputs according to the methods described for the invention and sends alternate outputs to the OS graphics display interface. The OS responds normally and processes the outputs to send them to the tracked display. In the case of network protocol interception, the SCD system outputs appropriately formatted commands back into the network path for reception by the terminal device. These details can be implemented by those having ordinary skill in the art.

In some embodiments, User Windows techniques (5107) comprise a set of 1) fault tolerance techniques useful for locating and placing the user window under non-ideal fault conditions (5205) where the gazepoint data is inaccurate, or highly variable, 2) techniques for sizing and shaping the user window according to the user's current task (5206), and 3) compensating for system latencies by predicting near term user gazepoint locations (5207). These details can be implemented by those having ordinary skill in the art.

Some embodiments include Fault Tolerance techniques (5205) that are configured to mitigate the effect of the inevitable occurrence of inaccurate gazepoint data. Gazetrackers often output erroneous gazepoints due to environmental factors and sensor limitations. The SCD implements two compensation mechanisms: 1) jitter compensation and 2) multiple gazepoint support. In jitter compensation the system compensates for gazepoint jitter (erratic variances in gazepoint location not related to actual eye movements), which can be significant even under good conditions. Due to system latency, even if the jittery gazepoint data was completely accurate, the user window would often be presented at a point away from the current gazepoint. The present invention applies a short-duration filter to the gazepoint data to compensate for jitter. The short duration filter slows the rate of user window movement sufficiently to remove unintentional transitions. The disadvantage of the user window placement filter is that it can prohibit the SCD system from tracking rapid intentional gazepaths if not compensated by the second mechanism, multiple gazepoint support. Multiple gazepoint support permits the system to open new potential user windows at new gazepoints as soon as they are detected. The fault tolerance mechanism (5205) presents limits to jitter in existing user windows, and allows new prospective user windows to be opened up if gazepoints are detected outside an active user window. The existing windows remain open for a defined period of time, typically 100 ms to 1,000 ms, and then are closed if no additional gazepoints occur in or near them. This mechanism compensates for the appearance of spurious inaccurate gazepoints by maintaining the user window, while also allowing for the possibility that the new gazepoint is in fact accurate. These details can be implemented by those having ordinary skill in the art.

In some embodiments, Task Specific Windows (5206) functions adapt the shape of user windows to specific user tasks. Exemplary implementations of the present invention implement windows of arbitrary size and shape, but two particular types are used for the common tasks of reading and scene perception. For reading, a rectangular window is appropriate, e.g., for English readers, an effective window typically spans from approximately 10 characters to the left of the gazepoint to 30 characters to the right of the gazepoint. The height of the window can be as little as one line of text, or can be increased to a plurality of lines to counteract gaze tracking inaccuracies. For scene perception, a circular window approximately two degrees wide, centered on the gazepoint, is appropriate. The two-degree span corresponds to the approximate size of the foveal region of maximum visual acuity. These details can be implemented by those having ordinary skill in the art.

Exemplary implementations of the present invention shift between the two primary window shapes automatically based on the type of content at the gazepoint. Further refinements are enabled by analyzing the most recent gazepath behavior to determine if it is more similar to a reading pattern or a viewing or searching pattern. Reading patterns are generally characterized by a series of fixations and saccades of less than one degree in magnitude across a horizontal path (or vertical paths for some languages), which corresponds with the process of fixating individual words in sequence. A simple discriminator method characterizes everything that is not a reading pattern as a view or search pattern. Automatic switching to appropriate window shapes improves the user's perception of system quality as it makes task execution easier. Other window shapes and corresponding task discriminators can be implemented as appropriate to improve task execution. These details can be implemented by those having ordinary skill in the art.

In some embodiments, Gaze Prediction (5207) is configured to compensate for some system latency by predicting the near-term gazepath trend. The gaze prediction function implements a predictor model that takes a set of recent gazepoints as input and predicts a most probable rate and direction for the gazepath. The gaze prediction function improves perceived user experience by automatically opening new user windows in the locations predicted by the model, just ahead of the current gazepoint. When the model correctly predicts the next gazepoint the user experience is improved because the user window can be presented sooner, possibly even slightly before the user gazepoint arrives at that location. The present invention also includes heuristic gaze prediction methods. For example, one particularly useful heuristic method is to detect when the user is reading and nearing the end of a line of text. When this occurs, the heuristic model predicts the next gazepoint will likely fall on the first word of the next line, as is typical in a normal reading task. When the model incorrectly models the next gazepoint the user experience is not affected, although the attacker is presented with slightly more information for a brief period. If the user gazepoint fails to land in a predicted and opened user window, the fault tolerance mechanism (5205) applies and the window is closed soon after. Other heuristic gaze predictors can be included in the SCD system to improve the user experience. These details can be implemented by those having ordinary skill in the art.

In other embodiments, Change Blindness technique (5106) applies to reducing the visibility of screen changes to the user by making changes occur gradually. The change blindness features (5106) take advantage of these perception characteristics by blending changes from user windows to false windows. The change blindness feature only applies to display features that are away from the user's direct interest as indicated by the gazepoint. An appropriate technique for presenting content at the user gazepoint is to display it as quickly as possible to the use in order to minimize the user's perception of the SCD. In order to minimize the peripheral effects of transitions in other screen data the invention blends changes over a short period of time whenever possible, rather than making the changes abruptly. Abrupt changes are generally very noticeable to a user, even in the peripheral field. In the interest of security, the transitions must be made over a shorter period of time than indicated by the change blindness research. The invention achieves notable improvements in perceived quality by fading out old content and fading in new content predicted by Gaze Prediction (5207) over a period ranging from 100 to 1000 milliseconds. These details can be implemented by those having ordinary skill in the art.

In some embodiments, a View Morphology (5107) operation is responsible for maintaining the general whitespace structure, placement, intensity, contrast, color, texture and object placement of the original content on the display at all times except during the presentation of disruptors (5103). The View Morphology (5106) function is designed to ensure that information relevant to the general format of a display is always available to the user but not the specific information about the content such as the actual character values. Morphology preservation plays a valuable role in usability as it provides the user with important clues to object location in the parafoveal and peripheral fields. This information is important as a memory and navigational aid, and forms the basis for targeting some saccades. These details can be implemented by those having ordinary skill in the art.

In some embodiments, a Gazetracker subsystem (5308) is responsible for providing gazepoints to other components of the SCD system. Gazetracker devices are commercially available and generally comprise a combination of hardware and software components and use a variety of interfaces to other systems, such as an SCD. The Gazetracker subsystem (5308) provides a common interface to gazetracker data for the other components of the invention, regardless of the peculiarities of a particular gazetracker device implementation. These details can be implemented by those having ordinary skill in the art.

It should be recognized that other embodiments can be configured as a computer program product in a computer-readable memory for enabling the secure display of specified visual content on the display device of a user. Alternatively, yet other embodiments can be configured as an apparatus for the same purpose. Still other embodiments of the present invention can also be configured as a system, comprising one or more processors, memory, one or more visual display devices and one or more input devices, for enabling the secure display of specified visual content on the display devices of an authorized user of the system. Such a system further comprises the components or elements previously described for the computer program product.

6.2.1 Secure Content Display (SCD) System Protection Profile

The present invention is effective against three main eavesdropping threats: 1) Direct Visual Eavesdropping, 2) Video Recording, and 3) Compromising Emanations. Each of these is described in more detail below.

6.2.1.1 Direct Visual Eavesdropper Security

The experience of an attacker is very different from that of a user. Using the present invention, an attacker sees a display that contains mostly false content, with possibly a small region of true content. The attacker cannot recognize the true content amidst the false content, because the display morphology does not substantially reveal obvious areas of modification and the content masking techniques make false content appear to be substantially similar to true content. The attacker is further challenged by changes in the display as it is constantly updated in response to changes in the user's gazepoint. The user window is accompanied by a number of identically shaped false windows that follow the same general pattern of motion as the user window. Due to natural physiological differences, an attacker's gazepath does not match the saccade and fixation characteristics of the user except by low probability coincidence. These differences make it challenging for an attacker to maintain tracking on any prospective windows (false or real) that he may acquire in his visual search routine. In addition, during user saccades when the user's visual sensitivity is substantially reduced, the system occasionally displays disruptive images that briefly replace the normal contents on the screen. These disruptors are not sensed by the user, but they are very often sensed by the attacker and lead to further reduction in the attacker's ability to concentrate on collecting information from the display.

The cumulative effect of the content masking techniques and the distraction techniques is to cause the attacker to spend more time and attention finding and processing false information and less time processing and recognizing true content. The ratio of true content collected versus false content observed is dependent on the security parameters used in the embodiment of the invention and its configuration, and the nature of the content.

6.2.1.2 Video Recording Security

It is possible that the content displayed could be recorded by a video recorder and subjected to subsequent analysis. Initial replay of a screen recording has the same effect on an attacker as does a live viewing. However, it may be possible for an attacker to methodically analyze a recording and, in some implementations, to extract a set of potential original content. From this set of potential original content it may be possible, in some circumstances, for an attacker to differentiate between the false content and the true content. For example, if the true content is known to be about one particular topic, and the false content is selected from a completely different topic it may be possible for an analyst to discard some or all of the false content and keep some or all of the true content. The resulting items of probable true content could be pieced together to give a potentially adequate impression of the true content.

However, it should also be noted that in some circumstances it will not be possible to separate the false content from the true content. For example:

The system protects a structured display of geographic coordinate information. The true content in one position is "79°". Whenever the operator looks at that position he sees "79°", but when he looks away the system changes the data to a randomly time-varying false value such as "52°".

This particular example illustrates an implementation which would prevent an adversary from extracting content from even a full video recording of the session. By generating false content that is indistinguishable from the true content, the system prohibits an attacker from achieving certainty about the data displayed. The system can also be useful in tactical operational scenarios where information need only be protected for a limited time, if it can present a problem sufficiently challenging as to require a human analyst to distinguish real from false content, and thereby slow the analysis beyond the useful life of the information.

6.2.1.3 Compromising Emanation Security

The Secure Content Display (SCD) System achieves substantial reductions in electronic and optical emissions useful to eavesdroppers from the video output component of a display system, such as a computer monitor screen. The SCD System achieves these reductions by simply not rendering the majority of true content that would normally be broadcast by the display. The Secure Content Display (SCD) System only emits true content within the user window and not across the entire display at all times, as is done by unprotected systems. This approach achieves emanation reductions from two properties:

1. True content is not displayed when the user is not looking at the display.
2. Most of the content presented on the screen is false content. Only a fraction of the display area contains true content at any point in time. Everything else is "manufactured" by the system or obscured.

When used in combination with conventional TEMPEST protections, the Secure Content Display (SCD) System provides a substantial improvement in emanation security.

6.3 An Exemplary Embodiment

To use one exemplary embodiment of the present invention, a user sits at a computer workstation that is provided with a gazetracker device. The user boots up the computer and gazetracker, and the present invention's application or software program is started manually by the user or automatically during the computer startup sequence, as depicted in FIG. 6. The application starts (6100). The user selects a user name (6200) using the user interface. The system defaults to the last user name used. The user can override the default choice to select a name or specify a new user. The system also can be configured to associate the user name with the authentication credentials used to access the computer workstation. For example, the system could use the name associated with the current active Windows user to determine the user name to be used for the session. If the user is a new user (6300), the system provides the option to create a new user name and to provision (6400) that user account according to the administration policy. The system loads the user profile (6500) associated with the user name. The system starts the gazetracker (6600) and begins computing the user's gazepoint. The system provides a user interface control that provides the user a set of user profile management options (6700) including but not limited to: a) specification of applications to protect, b) security option settings, c) user management and calibration options. The system starts the GCCP Operation (6800), and begins protecting the display for the selected applications according to the gaze-contingent data-in-use security methods described herein. The system gives the user options to exit the application (6900), and terminate the process (6999).

6.3.1 Gaze Contingent Content Protection (GCCP)

In one embodiment, the GCCP operation comprises the set of techniques and functions defined by 5004, 5005, 5006, and 5308 in FIG. 4. GCCP may be implemented in any Operating System such as Microsoft Windows, Apple OS/X, or Linux, by video content manipulations in special devices or by embedded functions compiled into software applications or provided dynamically for their use as required. An exemplary embodiment exists as a Microsoft Windows implementation that uses the Microsoft GDI interfaces. Other implementations can be embodied similarly in the Apple OS/X operating system by interfacing the SCD methods with Apple's Quartz 2D graphics subsystem in a manner similar to the way the SCD interfaces with Microsoft's GDI to intercept content as applications request it to be rendered for display, and re-inserting SCD-protected content in place of the original content. For Linux implementations, graphics layer interception and re-injection mechanisms can be implemented using the open-source libart and Cairo libraries.

6.3.2 An Exemplary Microsoft Windows Software Implementation Embodiment

The principles discussed above are exploited in the SCD system by confining true content to a user window of a configurable and limited size on and around the user's gazepoint for a protected application. In addition, false windows, containing false content, are also created in areas away from the user's gazepoint, and, in some embodiments, at locations related to it. As shown in FIG. 6, the user window (710) contains true content, but the false windows (720 and 730) contain false content. As the user's gazepoint moves, the user window moves with it, and the false windows move as well.

6.3.2.1 Main Application Functionality

6.3.2.1.1 Methodology

In order to protect the content of a protected application running within an operating system, the following methodologies are employed in some exemplary embodiments:

1. Mirror the Display of all Graphics and Text Operations in the Operating System onto Alternate Display Surfaces: This approach requires that alternate display surfaces be created, each with different interpretations of the content of the display. As the gazepoint falls upon different portions of the display, certain portions of those surfaces are chosen depending on whether the content falls within a user window, a false window, or neither.
2. Intercept Text and Graphics Display Functions and Modify the Content as it is being Displayed: This approach requires the injection of code into running processes that is capable of diverting calls to the display functions in a manner that allows for the selective display of content, depending on whether the content falls within a user window, a false window, or neither.
3. A Combination of Both: This approach operates similarly to approach 2, with the exception that display functions generate alternate display surfaces which are selectively chosen as in approach 1.

The following discussions describe approaches 2 and 3. Approach 1 is implemented with a low degree of additional complexity.

6.3.2.1.2 Hooking Selected Display Functions—Win32

Hooking is a technique used to make a chain of procedures ("hooks") behave as an event handler. When the handled event occurs, control flow follows the procedure chain in a specific order. The newest hook registers its own address as the handler for the event and is expected to call the previously registered event handler at some point, usually after the newer hook's event processing is complete. Each hook is required to pass execution to the previously registered handler. A single implementation for each individual hooked display function must be provided, whether it is a graphics or text display function. It is crucial that the signature of the interception routine be exactly the same as the original function prototype, otherwise the stack will be corrupted. For text interception, all of the Windows GDI functions relating to the display of text are hooked, such as TextOutA( ), TextOutW( ), ExtTextOutA( ), ExtTextOutW( ), PolyTextOutA, etc. As shown in FIG. 7, once the Hook Library (1305 and 1316) is loaded into the address space of a process (1324) and the interception engine (not shown) is activated, each time a call to the original GDI function is made, the hooked function (1317) is called instead. The hooked function (1317) then decides how to display the content (1320, 1322, or 1321) depending on which area of the screen that the content resides in (1319). A similar treatment is given for graphics related functions, such as BitBlt( ) and StretchBlt( ).

The following sections describe the mechanisms whereby the main application achieves the protection of targeted processes.

6.3.2.1.3 API Hook Integration

FIG. 8 depicts the work flow of the data protection system employed by the Trusted Display application:

The main components of the application are as follows:
1. Main Application (1250)
   1a. Configuration Manager (1201): Responsible for loading and updating configuration data (as modified through the user interface), as well as disseminating this information to other modules or threads running in the application space
   1b. Message Loop (Main Application Thread) (1203): Responsible for servicing the user interface and dispatching tasks as directed (1206), such as starting and stopping protection of selected applications (1207).
   1c. Gazepoint Monitor Thread or Callback (1209): Responsible for monitoring changes in gazepoint data through a polling thread or installed callback function, depending on the currently selected gazetracking device
   1d. Process Monitor Thread (1214, 1216, and 1217): Thread which is responsible for monitoring newly created process events created by the Kernel-Mode Driver
2. Kernel-Mode Driver (1260): Responsible for creating an I/O Device (1220) for signaling the Main Application (1250) when new processes are created, creating a global notification event (1221) triggered on process creation and installing a Kernel-Mode hook for detecting process creation (1222, 1223, 1224, 1225, & 1219).
3. External Hooked Process (1218): A Protected Application Once the Main Application loads the configuration data (1201), it drops into a message loop (1203) that services the User Interface (UI) (1206). The remainder of the diagram depicts the events that follow when the user has started protection via the UI. Upon start (1207), the application creates a thread or installs a callback function which is responsible for monitoring gazepoint data returned by the gazetracker (1209). Whether a monitoring thread is created or a callback is installed is dependent upon the API offered by the gazetracking hardware (it is preferable to use event-driven callback functionality where available in order to avoid unnecessary polling overhead). From this point, the API Hook Library is loaded into the application space and activated. There are two types of hooking available to the application:

1. System Wide Hook (1205) The operating system provides an API which causes the API Hook Library (1211) to be loaded instantly (1205) by all currently running processes and any new processes created from that point onward. In this case, the Hook Library decides on its own as it is activated (1212) and loaded (1211) into a protected application's space whether or not the application is to be protected. This is accomplished by reading the configuration in shared memory (1310 in FIG. 14) of the Hook Library (1211) which in turn is managed by the main application (1250).

2. Process-By-Process Hooking: This hooking method is broken down into the following sub-processes:
   2a. Retrieving the Current Process List (1202) The current process list is queried from the operating system via API calls provided by the operating system.
   2b. Injecting the API Hook Library into Selected Processes (1204) The API Hook Library is loaded into the application space of selected applications. For Win32 operating systems, this is done via creating a remote thread in the application's space and executing a load library call.
   2c. Loading the Kernel-Mode Driver (1210) The Kernel-Mode driver is installed as a service in the operating system. This service creates an I/O control interface (1220) for exchanging information with applications running in User Mode, as well as a global event (1221) used for signaling the application that an event of interest has occurred, namely the creation of a new process.
   2d. Creating the Process Monitor Thread (1208) The Process Monitor thread is responsible for handling the creation of new processes in the operating system and determining if these processes are to be protected by the application. To accomplish this, a wait state (1214) is entered which waits for the signaling of an event (1224) triggered by the Kernel Mode driver (1260). Upon the signaling of the event, the thread queries the driver for information about the newly created process (1217) and based on that information it injects the Hook Library into the processes (1216 and 1218) Upon loading the Hook Library, the external process (1218) installs function hooks into display functions via the Hook Library.

6.3.2.1.4 Protecting Document Content Upon a Change in Gazepoint

FIG. 7 depicts the work flow of the data protection system employed by the application upon detecting a change in the gazepoint of the user.

The Gazepoint Monitor Thread or Callback Function (1301) is responsible for detecting a change in the user's gazepoint, and provides an interface to the Gazetracker hardware (1303) Upon notification by the hardware that a change has occurred (1302) (or the thread polls the hardware (1302) and makes the determination), the main application (1323) calls an exported function (1304) in the Hook Library (1305) that notifies the Hook Library of the event, SetGazePt). The function (1306) then performs the following operations:

1. Gets the operating system window under the gazepoint (1307). This window is then matched against a list of protected windows per application.
2. Makes determinations based on eye movements (using gazepoint history data) whether a saccade has begun or ended, and decides the number and type of distracters to display. Calculates and sets (1308) any shared memory (1310) variables, such as the position and size of the user (1311) and false (1312). windows. The shared memory section (1310) of the Hook Library (1305 and 1316) is memory that is intentionally shared across all instances of the Hook Library (1305 and 1316 and 1218 from FIG. 13) and as such contains common information accessible in the memory space of any application (1323 and 1324) that loads the Hook Library (1305 and 1316).
3. Makes a determination based on eye movements (using gazepoint history data) whether the eye movements are reading, viewing graphics, or searching. This categorization of eye movement allows the appropriate method of gaze prediction to be employed thereby improving usability.
4. Estimates where the user Blindspot is located based on current gazepoint. Locating False Windows and Distracters (1308) in this region is more likely to be unnoticed by the user, thus allowing an increase in active attack prevention technique use without detracting from usability. When a user looks at the center of the display his blindspots are close to the edge of the display on a typical screen. When one blindspot false window goes off the screen, it is not used.

5. Fault Tolerance Techniques for Erroneous Gaze Points:

5a. Eye jitter (very small movements of the eye) is normal and a smoothing of small intermittent errors and small gazepoint changes is necessary to produce a flicker free user window. If the small gazepoint movement falls within the user window boundaries it is ignored. The center of the user window may be readjusted based on the weighted average of three or more gaze points:

$$Pmean = 1P0 + 2P1 + \ldots + pn - 1\ 1 + 2 + \ldots + n$$

5b. User windows are displayed at all gaze points found outside of the current user window. If subsequent gaze points do not fall within the new user windows the new windows are removed by fading to false content. If subsequent gazepoints fall within a new window then the old window is removed by fading to false content.

6. User gaze prediction techniques to improve usability:

6a. In reading-mode eye movements can be predicted as small jumps from word to word with a high probability for skipping over words of three characters or less. A forward prediction filter is used:

$$x(t+1) = \text{Delta} + x(t)$$

$$\text{Delta} = (x(t) - x(t-n))/n \text{ where } n = 100 \text{ ms}$$

When a large saccade is detected the small saccade predictor is reset.

6b. As the gaze point reaches the boundary of an application's window, the user window can begin to be displayed at the beginning of the next line of text in anticipation of a large saccade.

6c. Regression probabilities can be predicted based on the complexity of the text and represent the eyes' movement to previously read content. Eye movements typically move in two segments, the first saccade to the general area of the word to be reviewed, and the second saccade a smaller movement to a point optimal for reading that word. When a regression is detected a user window is opened on each side of the initial saccade and adjusted based on the final eye adjustment saccade.

6d. Fixation on any word is anticipated to be between 200 and 250 msec. As this time is approached and exceeded the probability of a saccade to a new location increases.

7. Prediction of the saccade vector is most important when viewing graphics or searching, and is accomplished by calculating the eye velocity and direction (1308). A user window is opened along the path of the saccade to the estimated termination point. This path-window is faded to false content after the eye is determined to be in fixation or a new saccade is detected.

8. The resulting windows are invalidated via a call to the operating system API (1309), causing them to be redrawn by the graphics display system though a call to InvalidateRect( ).

The InvalidateRect call in Win32 OS forces the operating system to "invalidate" or "mark as dirty" a specific rectangular region of a specific display window. This is a "cause-effect" operation which forces the operating system to re-draw the rectangle of interest (since it thinks its contents are now invalid), and hence enables us to redraw User and False windows in another process' memory space via the cause-effect. Once the windows are invalidated, the operating system dispatches messages to the applications that own the windows, informing them that they need to be redrawn. This triggers the following series of events in the protected application's space (1324)

1. Receives message that the rectangle within the window has been invalidated (1314).
2. Dispatches a repaint message to the window (1315) which (in the case of a window containing text) in turn calls one of the GDI text functions (Win32)
3. Since the text functions are hooked, the function call is re-routed to the intercepted hook function, shown in the diagram as "HookedExtTextOut" (1317).
4. Each call to the text function supplies an [X, Y] position for the text to be displayed. This position is compared (1319) to the position of the user (1311) and false (1312) windows obtained (1318) from shared memory (1310).
   4a. If the text lies in the user window, it is displayed as received by the function (1321).
   4b. If the text lies in a False Window, the text is obfuscated with the Stein Transformation in a specific way (1320), using data supplied by the Stein Transform Dictionary (1313).
   4c. If the text lies within neither a user nor False Window, the text is obfuscated (1322) via the basic Stein Transformation, using data supplied by the Stein Transform Dictionary (1313).

6.3.2.1.5 Chameleon API Hooking Library 6.3.2.1.5.1 Hooking Methods, Win32

First and foremost, it is necessary to select an implanting method that meets the requirements for injecting the DLL driver into all processes. This design is an abstract approach with two injecting techniques, each of them applied accordingly to the settings in the configuration file and the type of the operating system (i.e. Windows NT based or Windows 95/98). They are: System-wide Windows Hooks and Hooking via the CreateRemoteThread( ) method.

The framework offers the ability to inject the DLL on Windows NT based operating systems by Windows Hooks as well as to implant by the CreateRemoteThread( ) means.

6.3.2.1.5.2 Hooking Mechanism, Win32

This design applies altering the Import Address Table (IAT) of a process as an extremely robust method for Win32 API interception.

6.3.2.1.5.3 Class Design—Chameleon Hook Library, Win32

This section discusses the class design of the framework as depicted in FIG. 15. Each of the presented classes provides a specific functionality and represents a particular logical entity.

6.3.2.1.5.3.1 CModuleScope (1401)

CModuleScope (1401) is the main entry point of the system. It is implemented using "Singleton" pattern and works in a thread-safe manner. By this means the values of those system-wide variables can be maintained very easily inside the class, keeping to the class design rule for encapsulation.

When an application loads the hook library, the DLL creates one instance of CModuleScope (1401) on receiving DLL_PROCESS_ATTACH notification. This step just initializes the only instance of CModuleScope (1401). An important piece of the CModuleScope (1401) object construction is the creation of an appropriate injector object. The decision of which injector to use is made after parsing the configuration file. In case that the system is running under Windows 95 or Windows 98, the value of this parameter won't be examined by the system, because Windows 95/98 doesn't support injecting by remote threads.

After instantiating of the main processor object, a call to CModuleScope::ManageModuleEnlistment( ) method is made. The implementation of the method ManageModuleEnlistment( ) is straightforward and examines whether the particular module needs to be hooked.

The next action taken by the main application is to activate the hooking engine through a single call to the InstallHook( ) DLL exported function, which is actually delegated to the CModuleScope::InstallHook( ) method. The main purpose of this function is to force processes targeted for hooking to load or unload the Chameleon Hook Library.

CModuleScope::InitializeHookManagement( ) is a method used to install hooks for some vital functions such as the LoadLibrary( ) API family as well as GetProcAddress( ). By this means the loading of DLLs can be monitored after the initialization process. Each time a new DLL is about to be mapped, it is necessary to fix-up its import table, thus ensuring that the system won't miss any calls to intercepted functions. Additionally, all text and graphics related functions implemented by the GDI library are hooked here as well.

6.3.2.1.5.3.2 CInjector (1406), CRemThreadInjector (1407), CWinHookInjector (1411)

The hook library provides two mechanisms for self injecting into the address space of an external process—one that uses Windows Hooks and another that employs injecting of DLL by CreateRemoteThread( ) API. The architecture of the system defines an abstract class CInjector (1406) that exposes pure virtual functions for injecting and ejecting DLLs. The classes CWinHookInjector (1407) and CRemThreadInjector (1411) inherit from the same base—CInjector (1406) class. However they provide different realization of the pure virtual methods InjectModuleIntoAllProcesses( ) and EjectModuleFromAllProcesses( ), defined in CInjector interface.

CWinHookInjector (1407) class implements Windows Hooks injecting mechanism. It installs a filter function by the SetWindowsHookEx Win32 API call.

A different approach is demonstrated by the CRemThreadInjector (1407) class. Here the implementation is based on injecting the DLL using remote threads. CRemThreadInjector (1407) extends the maintenance of the Windows processes by providing means for receiving notifications of process creation and termination. It holds an instance of CNtInjectorThread class that observes the process execution. CNtInjectorThread (1408) object takes care for getting notifications from a kernel-mode driver. Thus each time when a process is created a call to CNtInjectorThread::OnCreateProcesso is issued, accordingly when the process exits CNtInjectorThread::OnTerminateProcesso is automatically called. Unlike the Windows Hooks, this method relies on a remote thread, and requires manual injection each time when a new process is created. Monitoring process activities provide a simple technique for injection when a new process starts, and is accomplished through the installation of a kernel-mode driver.

6.3.2.1.5.3.3 CNtDriverController (1410)

CNtDriverController class implements a wrapper around API functions for administering services and drivers. It is designed to handle the loading and unloading of the kernel-mode driver developed with the hook library.

6.3.2.1.5.3.4 CLogFile (1405)

The CLogFile Class is a utility class which implements logging of the API hooking process.

6.3.2.1.5.3.5 CApiHookMgr (1402), CHookedFunctions (1403), CHookedFunction (1404)

The CApiHookMgr class is responsible for implementing and managing at a high level the hooking of all desired Win32 text and graphics functions, and has a CHookedFunctions class which in turn has (via mapping) the CHookedFunction class. The CHookedFunctions class implements a mapping of hooked function names to their corresponding runtime address. The CHookedFunction class maintains all information necessary to catalogue a hooked function, including the function name, the original address of the hooked function, and the address of the function after it has been hooked.

6.3.2.1.5.3.6 CNTProcessMonitor (1409)

The CNtProcessMonitor class governs the monitoring of the creation of processes in the User Mode, and is the bridge between the User mode application and the Kernel Mode Driver which is monitoring for the creation of new processes. It is responsible for creating the Kernel Mode driver at runtime and monitoring the events which are triggered from the driver at the onset of process creation by the operating system.

6.3.2.1.6 Kernel-Mode Driver, Win32

Windows NT-based operating systems provide a set of APIs documented in the Windows DDK as "Process Structure Routines" exported by NTOSKRNL.DLL. One of these APIs, PsSetCreateProcessNotifyRoutine( ), offers the ability to register a system-wide callback function that is called by the OS each time a new process starts, exits or has been terminated. The said API can be employed as a simple way of tracking down processes simply by implementing a Windows NT kernel-mode driver and a user mode Win32 control application. The role of the driver is to detect process execution and notify the control program of these events. The driver provides a minimal set of functionalities required for process monitoring under WindowsNT based systems.

6.3.3 Protection Techniques

FIG. 6 shows a typical word processing application which has been protected. As shown in the figure, the area of the currently loaded document bounded by rectangle (710) is the actual text of the document; all text in other areas of the display has been masked to convey no real information to any possible on-lookers.

TABLE 1

Saccade Algorithm Definitions

| Term | Function |
|---|---|
| Acceleration Threshold | The threshold for eye acceleration that is used to detect the onset of a Saccade |
| Deceleration Threshold | The threshold for eye acceleration that is used to detect the conclusion of a Saccade, coined as "deceleration" for scalar quantities |
| Smoothing | Algorithm used to smooth, or average out, non-trend data points. |
| Retrace | The eye movement from right to left used as a qualifier that the eye movement is a saccade |
| Retrace Threshold | The number of pixels moved to the left that constitutes a Retrace. |

To facilitate saccade detection, a method is implemented in the application as follows:
 1. Trigger a saccade if the current eye acceleration is greater than the Acceleration Threshold.
 2. Once a saccade is triggered, immediately activate any saccade-dependent functions (such as false windows (720 and 730) and distracters).

3. When the eye acceleration value falls below the Deceleration Threshold, the saccade has ended. Reset all triggers and counters.
4. Ignore all "saccades" that are calculated to be moving at greater than 900 deg/sec. These generally result from errors in the gazetracker hardware or reporting mechanisms.

6.3.3.1 Active Attack Prevention 6.3.3.1.1 Distracters—Grey Frame

On large saccade detection, the entire screen is blanked with a grey image for 25 milliseconds. On the Windows family of operating systems, this is implemented via the Direct 3D API as a surface texture.

Other distracters can include high contrast displays such as horizontal or vertical alternating black and white bars, images both in high contrast, such as a black fly on a white background, or still full images, or scenes played one frame at a time to subliminally disturb an attacker.

6.3.3.1.2 False Windows

Multiple "False Windows" (720 and 730) are introduced into the display which appear to be valid windows into the true content of the document, the number of which is configurable by the application. These windows follow the same motions as the true text (user) window, and as such maintain a constant relative spacing to it in one or more dimensions, wrapping from beginning to end and top to bottom in the protected document window. This is a type of motion designed to make the relative motion of the false windows the same as the user window. For example, if the real gazepoint follows a path (x0, x1, x2, x3), then a given false window follows the path (w0, w0+(x1−x0), w0+(x2−x0), w0+(x3−x0)), where w0 is a random start position for the false window. The content of the false windows is information or graphics which is transformed in a different manner than the rest of the false information in the document, giving possible attackers the perception that the user is looking where the false window is appearing.

In FIG. 6 a protected application is shown displaying textual content. In this figure is shown: The User Window (710), with velocity of quantity (Vx,Vy) in screen space and initial position x,y; False Window 1 (720), with velocity of quantity (Vx,Vy) in screen space, and with additional offset dx1, dy1 from the User Window; False Window 2 (730), with velocity of quantity (Vx,Vy) in screen space, and with additional offset dx2, dy2 from the True (user) Window; the remainder of the document, obfuscated.

Each False Window (710 and 730) is placed at some fixed offset (x+dx, y+dy) from the True Window, and moves with the same velocity (Vx, Vy) as the True Window. In this manner, the False Windows always remain at a fixed distance (dx, dy) from the True Window as they move over a given time t. As the center positions of the False Windows cross the document window boundary, they are clipped and eventually wrap to the corresponding opposite side of the document.

6.3.3.1.3 Loss of Gazepoint Module

The Loss of Gazepoint module detects and responds to a loss of gazepoint for one more users. Loss of gazepoint can be caused by one or more of the following factors: 1) a user looks away from the screen, 2) a user blinks, 3) a user closes their eyes, 4) the gazetracker malfunctions.

If a gazetracker malfunctions, it results in an error condition in the SCD and is reported as such. The time during these events is used to implement one or more distracters. During this time, the user window is not shown. A loss of gazepoint is detected by the SCD when no tracking data is received from a gazetracker for a specified amount of time. The threshold for the test is configurable on a system by system basis.

6.3.3.1.4 Stare Detection Module

In one embodiment a Stare Detection module detects when the eye fixes on one spot for a long time. By assuming that the user is likely to be staring at the screen and not absorbing any new information, and that information left on the screen is thus exposed to an attacker without benefit to an authorized user. The stare detection mechanism determines when information can be removed from the screen without affecting the usability of the system.

A stare is detected when the SCD does not detect significant eye movement for a predefined amount of time. Both the amount of eye movement, and the time threshold are configurable on a user by user basis. Eye movement outside the range of significant indicates that normal processing should resume.

During the time a stare is detected, the user window (710) is closed. When the state detection module determines that the user is no longer staring, the user window is reopened (if the gaze is still present for that user window).

6.3.3.2 Text Processing—Implementation of the Stein Transformation

There area plurality of methods for generating replacement content for the Stein Transformation including but not limited to these three models:

Model 1: Word for Word replacement where any word of similar length may be replaced by any other word of similar length Model 2: Word-type for Word-type replacement where words are replaced by words of the same lexical type and a similar length. For example, four letter verbs are generally replaced by different four letter verbs. In general, words of all grammatical types are replaced by selections from those types, resulting in the generation of sentences that have similar grammatical structure as the original sentence, and display the same whitespace, but that contain none of the original meaning. Word-type for Word-type replacement performs the following operations:

Word analysis, which a) determines the word length and b) determines the word lexical type/meaning For words in which the type is indeterminate, a noun is assumed. For words with more than one possible lexical meaning, any of the choices is allowed, and is selected randomly.

Word replacement. Based on the above analysis, an appropriate replacement word is chosen from a dictionary.

Model 3: Hidden Markov Model Content Generation, in which a content source is statistically modeled, and then the model is used to generate false output based on the statistical model. The Hidden Markov model content may be generated by reading one or more "seed" documents. A utility is provided that is available to be invoked at any time to generate a new Hidden Markov Model based on new seed documents. There are two steps in generating a Hidden Markov Model:

Step 1. The sentence structure Markov Model (MM) is generated by analyzing a source text prior to protecting user content.

Step 1*a*. An initial model is provided by the SCD system, which can be later supplemented or replaced by a user with user content-specific input.

Step 1*b*. A state in an MM represents a type of content (ie, something like a lexical unit), but does not exactly correspond to strict lexical units. The first state in an MM will tend to represent first words in sentences. The first state transitions probabilistically to other states that tend to represent potential second words, etc.

Step 1c. The Markov model portion of the MM can be represented simply by an n-by-n table where n represents the number of states. The table values are the probabilities of transitioning from one state to another state.

Step 1d. Compute for each state in the MM a list of words, and their probability of occurrence in that state. This is the "Hidden" part of the Hidden Markov Model (HMM) (see below) and comprises the outputs that the HMM will later generate.

Step 1e. State tables are constructed to also keep track of word lengths so words can be more easily selected later to maintain current page morphology.

Step 2. Using the Hidden Markov Model (HMM) to generate false text that has the same word length as the true content it is replacing Step 2a. The HMM is initialized in State 0 and subsequently changes state according to the probabilities in the MM table.

Step 2b. On entering the next state the HMM outputs a word from that state's table with appropriate probability and word length.

Step 2c The HMM may not have a word of the appropriate length in a given state. If this occurs then it outputs any correct length word from one the other tables.

6.3.3.2.1 Hash Function—Word Transformation

It is highly desirable that the transformation of specific words be reproducible when combined with other window-specific variables such that the tracking and accounting of transformed text can be avoided. This is accomplished by using a hash function $f$ that is executed on a text string such that:

$$f(\text{string}) = \text{unique constant}$$

Implementing a cyclic-redundancy check (CRC) algorithm as the hash function accomplishes this task. A CRC is a type of function that takes as input a data stream of any length, and produces as output a value of a certain space, commonly a 32-bit integer.

6.3.3.2.1.1 Word Dictionary

The dictionary of words to be used for the transformation at minimum is broken down into groups of words of similar length. This yields the following table of data:

```
       const char*
       SteinTransform[STEIN_MAX_LENGTH_WORDS]
       [STEIN_Y_DIVISIONS][STEIN_X_DIVISIONS] =
{
    { { "a", ...}, ..., },            // Length 1 words (8 pixels)
    { { "is", ...}, ..., },           // Length 2 words (16 pixels)
    { { "the", ...}, ..., },          // Length 3 words
    ...
    ...
    ...
    {..., { "additional", ...}, ..., },   // Length 10 words
    // Etc...
};
``` with:
STEIN_MAX_LENGTH_WORDS=n
STEIN_X_DIVISIONS=256
STEIN_Y_DIVISIONS=256,
which would yield 65536 words of each length up to n word lengths, for a total of n*65536 words.

In addition to grouping words of similar length, as mentioned above the table may be further broken down into categories of words of similar lexical meaning, i.e., nouns, verbs, adjectives, etc., in order to provide a higher degree of sentence cohesiveness for the transformation. This requires the categorization of a word before it is transformed. For this discussion, it is assumed that the table consists only of words of similar length. Another possibility for maintaining sentence cohesion is selectively deciding not to transform certain common verbs, pronouns, conjunctions etc. that in and of themselves lend no indication to the reader as to the content of a sentence. For example, words like "the", "is", "a", "in", and "for" may perhaps be safely ignored.

6.3.3.2.1.2 Using the Hash Function to Transform a Line of Text

In order to transform a line of text via the Stein algorithm, it is first necessary to break the line into individual words. This is accomplished by going character-by-character through the string and breaking on delimiting characters such as the space (" "), period ("."), dash ("-") and other common punctuation characters. As each word is encountered, its hash (CRC) is computed and used as an index into the table of data in the following manner (assuming a 32-bit hash):

$$\text{CRC}(\text{word of length } n) = 32\text{-bit constant}$$

Using the word "government" (length 10 characters) as an example:

$$\text{CRC}(\text{"government"}) = 0\text{x}32450962$$

Next, the 32-bit result is broken down into its upper and lower 16-bit constituent parts:

| | |
|---|---|
| X-Division = 0x3245 | (range 0-65535) |
| Y-Division = 0x0962 | (range 0-65535) |
| Word Length = 10 | |

Since the Stein dictionary is broken down into X and Y divisions of 256, the parts must be mapped to a range of 0 . . . 255:

$$0.65536 \div 256 = 0 \ldots 255$$

For the example above,

| | |
|---|---|
| X-Division = 0x3245 ÷ 256 = 0x32 = 50 | (range 0-255) |
| Y-Division = 0x0962 ÷ 256 = 0x09 = 9 | (range 0-255) |

Finally, the word length, X-Division and Y-Division variables are used as indices into the Stein Dictionary as such:

$$f(\text{"government"}) = \text{SteinTransform}[10][9][50] = \text{"additional"};$$

Given the division factor, it is possible for two different words to yield the same indices into the table and hence yield the same transformed word. However, this can be desirable in that it helps prevent decryption. Note that the table size or the CRC bit length may also be adjusted such that there is a one-to-one relationship between the indices for table lookup and the data table size for each word of length n.

The above algorithm is further modified to provide transformation uniqueness for each protected window by introducing a variable which always remains constant for a given window. One such variable for the Windows operating system is the window handle (HWND) of the window (32-bit):

$$f(\text{"government"}) = \text{SteinTransform}(\text{CRC}(\text{"government"}) + \text{HWND});$$

Additionally, a "seed" is introduced in the same manner which can be changed at will, thus providing a completely different transformation for all of the text in a given window.

Finally, in order to prevent words that appear several times from being transformed the same way, the CRC of the previous word is added to the current word's CRC as a line is parsed in order to change the index into the dictionary data. This is used in conjunction with the word's appearance count to guarantee that sentences which repeat are not transcribed in the same way as well, but also ensures that the transcription remains reproducible for content that has not changed. In addition, the tables that are used for the CRC algorithm are regenerated randomly at application startup, and ensures that documents are obfuscated differently every time the application is run.

6.3.3.3 Image Processing

As images are encountered in a document, various transformations are employed which can include any one or combination of the following:

1. Blurring the image outside of the user window
2. Blurring the image outside the user window using a gaze-contingent blurring algorithm such as a foveation algorithm which simulates the typical reduction in visual acuity with distance from the gazepoint.
3. Performing Optical Character Recognition to search for any text in the image, and then transforming the text via the Stein algorithm and overlaying it on the image
4. Searching for other patterns and basic shapes such as lines and rectangles and replacing them with adjacent colors in the image, effectively removing them, and then overlaying other shapes and patterns of a similar nature at random positions in the image
5. Swapping sets of every n pixels in the image in a vertical and/or horizontal direction
6. Performing other filter-type operations as demonstrated in popular drawing programs, such as high/low pass filters, sepia transform, negative transform, and the like outside of the user window to further obfuscate the graphical content 6.3.3.3.1 Modules The Trusted Display Application is the main driving module in the protection process, and performs the following tasks:

1. Reads, maintains and disseminates configuration data.
2. Decides which applications will be protected and how.
3. Provides a user interface through a Task Tray icon (Microsoft Windows) to perform various activities.
4. Integrates the API Hook Library by a) performing protection of targeted applications via hooking selected APIs and b) starting and stopping the protection of targeted applications.

6.3.4 Application Configuration Data

Configuration data for the application is broken down into two categories: 1) application configuration settings and 2) configuration settings per user.

All configuration parameters are stored in a local binary configuration file in a secure manner by employing an encryption algorithm. The configuration file also bears a version number for conversion to another configuration format in order to support future releases. The information is stored in the following sequence: 1) configuration version, 2) application configuration settings, 3) the user-specific configuration data, in order of the users as listed, for each user listed in "Users",

TABLE 2

| Application Configuration Data | | |
|---|---|---|
| Parameter | Description | Default |
| LoggingEnabled | If TRUE, logging is enabled | FALSE |
| LogFile | Full path of the file to log to | Defaults to "TrustedDisplay.log" in the application directory |
| InstalledGazeTrackers | Comma-separated list of installed gazetrackers, does not include the mouse. First tracker is internally represented by index 1. May be:<br>1. Tobii_XXX<br>2. SMI_XXX<br>3. EyeTech_XXX<br>4. CMOS_Sensor.<br>Where XXX, is the hardware revision | No Trackers. Mouse tracker is implicit and always index 0. |
| Users | Comma-separated list of users. Does not include the Default User. First user is internally represented by index 1 | No Users. Default User is implicit and always index 0 |

TABLE 3

| Per User Configuration Data | | |
|---|---|---|
| Parameter | Description | Default |
| Autostart | If TRUE, the application starts automatically when the operating system boots up | FALSE |
| ProtectOnStart | If TRUE, protection is started when the application is launched | FALSE |
| SystemWideProtection | If TRUE, system-wide protection is enabled, and all current and future running processes are protected. If NO, only applications listed in the "Protect" configuration parameter are protected | FALSE |
| ProtectAll | If TRUE, all applications are protected | FALSE |
| ProtectedApps | A comma-separated list of applications to protect; ignored if "ProtectAll = TRUE" | No applications |
| IgnoredApps | A comma-separated list of applications not to protect; only used if "ProtectAll = TRUE" | No Applications |
| Security | Values are High, Medium, Low, or Custom | High |
| Ignore | A comma-separated list of applications not to protect; only used if "ProtectAll = TRUE" | No Applications |
| FalseWindows | Number of False Windows to display, used if "Security = Custom" | 4 |

TABLE 3-continued

Per User Configuration Data

| Parameter | Description | Default |
|---|---|---|
| BlinkEnabled | If TRUE, Blink detection is enabled, used if "Security = Custom" | TRUE |
| SaccadeEnabled | If TRUE, Saccade detection is enabled, used if "Security = Custom" | TRUE |
| SaccadeAccelThreshold | Sacade Acceleration Threshold, used if "Security = Custom" | 15000 |
| SaccadeDecelThreshold | Sacade Deceleration Threshold, used if "Security = Custom" | 900 |
| TrueWindowWidth | Width in characters of the True Window, used if "Security = Custom" | 30 |
| TrueWindowHeight | Height in lines of the True Window, used if "Security = Custom" | 4 |
| TrueWindowOffset | % offset of the True Window, used if "Security = Custom" | 35 |
| GazeTracker | Currently selected Gaze Tracker, by index. | 0 |
| LastCalibrationTime | Last time the currently selected tracker was calibrated | 0 |
| LastFineTuneTime | Last time tracking was fine-tuned | 0 |

7 CONCLUSION

Thus, those having ordinary skill in the art will understand from the foregoing that the present invention addresses a critical need for providing security for displayed information. Using the present invention, sensitive information can be displayed without significant concern for eavesdroppers or interception by unauthorized viewers. Moreover, by manipulating the various parameters described herein, the present invention provides a scalable degree of protection. For example, the present invention can be configured to provide a "private" display, e.g., one in which any unauthorized user would be capable of intercepting only about 10% or less of the content, to a "secret" display, e.g., one in which an unauthorized user would be capable of intercepting only 1% or less of the content.

The foregoing is considered as illustrative only of the principles of the invention. Further, since numerous modifications and changes will readily occur to those skilled in the art, and because of the wide extent of the teachings disclosed herein, the foregoing disclosure should not be considered to limit the invention to the exact construction and operation shown and described herein. Accordingly, all suitable modifications and equivalents of the present disclosure may be resorted to and still considered to fall within the scope of the invention as will be later set forth in claims to the present invention.

What is claimed:

1. A computer-controlled display device for displaying secure content on a display to an authorized viewer and preventing an unauthorized viewer from seeing secure content, comprising: a gazepoint device configured to determine the gazepoint of said authorized viewer and said unauthorized user on said display, wherein said gazepoint device is not located on the display device, said authorized user, or said unauthorized user, said display device further being configured to render said secure content intelligibly to said authorized viewer in a secure content display window, said secure content display window being located in a secure content region of said display defined by said gazepoint such that said secure content display window can be seen by said authorized viewer and not by said unauthorized viewer, and render false content for viewing by said unauthorized viewer in the remainder of said display outside of said secure display region in a plurality of false content windows displaying false content that mimics content in said secure region to said unauthorized viewer, said gazepoint device being further configured to track the movement of said authorized user's gaze on said display to define a new gazepoint such that said display device renders accurately said secure content intelligibly to said authorized viewer in said secure content display window in said secure content display region of said display defined by said new gazepoint, and render false content to said unauthorized viewer in the remainder of said display outside of said secure display region in said plurality of false contents windows, said rendering of said accurate intelligible content and said false content being provided substantially simultaneously.

2. The computer-controlled display device of claim 1, wherein said device is configured to authenticate said authorized viewer.

3. The computer controlled display device of claim 1, further comprising a second authorized viewer, said gazepoint device is further configured to determine the gazepoint of said second authorized viewer; and said display device is configured to render content intelligible to said second authorized viewer in a second secure display region corresponding to the gazepoint of said second authorized viewer, and render unintelligible content in the regions of said display outside both said first secure display region and said second display region.

4. The computer-controlled display device of claim 3, wherein said gazepoint device comprises a gazetracking device that is configured to determine the gazepoint of each of said first and said second authorized viewers.

5. The computer-controlled display device of claim 3, wherein said gazepoint device comprises two gazetracking devices, each of said two gazetracking devices being configured to determine the gazepoint of each of said first and said second authorized viewers individually.

6. The computer controlled display device of claim 1, wherein said content in said second region comprises distracter images or disrupter images during user saccades.

7. A computer-controlled display device for displaying secure content on a display to an authorized viewer and preventing an unauthorized viewer from seeing secure content, comprising: a gazepoint device configured to determine the gazepoint of said authorized viewer and said unauthorized user on said display, wherein said gazepoint device is not located on the display device, said authorized user, or said unauthorized user, a gazepoint shift predictor configured to predict change in said gazepoint of said authorized viewer and estimate a new location of said gazepoint on said display, said display device further being configured to render accurately said secure content intelligibly to said authorized viewer in a secure content display window, said secure content display window being located in a secure content display region of said display defined by said gazepoint such that said secure content display window can be seen by said authorized viewer and not by said unauthorized viewer, and render false content that mimics content in said secure region for viewing by said unauthorized viewer in the remainder of said display outside of said secure display region in a plurality of false content windows displaying false content to said unauthorized viewer, said gazepoint device being further configured to track the movement of said authorized user's gaze on said display to define a new gazepoint such that said display device renders accurately said secure content intelligibly to said authorized viewer in said secure content display window in said secure content display region of said display defined by said new gazepoint, and render false content to said unauthorized viewer in the remainder of said display outside of said secure display region in said false content windows, said rendering of said secure content and said false content being provided substantially simultaneously.

8. The computer-controlled system of claim 7, wherein said device is configured to authenticate said authorized viewer.

9. The computer controlled display device of claim 7, further comprising a second authorized viewer, and said gazepoint device is further configured to determine the gazepoint of said second authorized viewer; and said display device is configured to render content intelligible to said second authorized viewer in a second secure display region corresponding to the gazepoint of said second authorized viewer, and render unintelligible content in the regions of said display outside both said first secure display region and said second display region, said intelligible content in said secure display region, said intelligible content in said second secure display region, and said unintelligible content in the remainder of said display outside of said secure display region and said second secure display region being displayed substantially simultaneously.

10. The computer-controlled display device of claim 9, wherein said gazepoint device comprises a gazetracking device that is configured to determine the gazepoint of each of said first and said second authorized viewers.

11. The computer-controlled display device of claim 9, wherein said gazepoint device comprises two gazetracking devices, each of said two gazetracking devices being configured to determine the gazepoint of each of said first and said second authorized viewers individually.

12. The computer controlled display device of claim 7, wherein said content in said second region comprises distracter images or disrupter images during user saccades.

13. A method for displaying secure content to an authorized viewer on a display device and preventing an unauthorized viewer from seeing such secure content, comprising:
receiving gazepoint information of said authorized viewer and said unauthorized viewer at a computer in electronic communication with said display, said gazepoint information being received from a gazepoint device, said gazepoint device not located on said display device, said authorized viewer, or said unauthorized viewer, said computer being configured to control the contents of said display such that said display provides a secure display window, said secure content display window being located in a secure content display region that moves dynamically with the movement of said gazepoint of said authorized viewer, said secure content display window being visible to said authorized viewer only;

defining the location of said secure display window corresponding to said gazepoint of said authorized viewer;

displaying secure content to said authorized viewer in said secure display window, and false content mimicking content in said secure region in the remainder of said display outside of said secure display region in a plurality of false content windows displaying false content to said unauthorized viewer, said secure and false content windows being displayed substantially simultaneously.

14. The method of claim 13, further comprising authenticating said authorized viewer.

15. The method of claim 13, further comprising predicting a shift in the gazepoint of said authorized user and estimating a change in the location of said gazepoint of said authorized viewer.

16. The method of claim 13, further comprising sending distracter images or disrupter images during said authorized viewer saccades to said display device for display as said content outside of said first region.

17. A non-transitory computer-readable medium containing a computer program product for displaying secure content to an authorized viewer on a display device and preventing an unauthorized viewer from seeing such secure content, said computer program product being configured to enable a computer coupled with a display to:
receive gazepoint information of said authorized viewer and said unauthorized viewer from a gazepoint device, said gazepoint device not located on said display device, said authorized viewer, or said unauthorized viewer, and control the contents of said display such that said display provides a secure display window, said secure content display window being located in a secure content display region that moves dynamically with the movement of said gazepoint of said authorized viewer;

define said secure display region corresponding to said gazepoint of said authorized viewer;

display said secure content to said authorized viewer in said secure display region, and false content in a plurality of false content windows displaying false content to said unauthorized viewer in the remainder of said display outside of said secure display region, said secure and said false content being displayed substantially simultaneously.

18. The non-transitory computer-readable medium of claim 17, wherein said computer program product is further configured to enable said computer to authenticate said user.

19. The non-transitory computer-readable medium of claim 17, wherein said computer program product is further configured to predict a shift in the gazepoint of said authorized user and estimate a change in the location of said gazepoint of said authorized viewer.

20. The non-transitory computer-readable medium of claim 17, wherein said computer program product is further configured to enable said computer to send distracter images or disrupter images during said authorized viewer saccades to said display device for display as said content outside of said first region.

* * * * *